US011659133B2

(12) United States Patent
Chu et al.

(10) Patent No.: US 11,659,133 B2
(45) Date of Patent: May 23, 2023

(54) IMAGE GENERATING SYSTEM WITH BACKGROUND REPLACEMENT OR MODIFICATION CAPABILITIES

(71) Applicant: Logitech Europe S.A., Lausanne (CH)

(72) Inventors: Joseph Yao-Hua Chu, Los Gatos, CA (US); Jeffrey Phillip Fisher, Dublin, CA (US); Ting Chia Hsu, Hsinchu (TW)

(73) Assignee: LOGITECH EUROPE S.A., Lausanne (CH)

( * ) Notice: Subject to any disclaimer, the term of this patent is extended or adjusted under 35 U.S.C. 154(b) by 3 days.

(21) Appl. No.: 17/191,143

(22) Filed: Mar. 3, 2021

(65) Prior Publication Data
US 2022/0272282 A1 Aug. 25, 2022

Related U.S. Application Data

(63) Continuation of application No. 17/184,573, filed on Feb. 24, 2021.

(51) Int. Cl.
H04N 5/272 (2006.01)
G01S 17/06 (2006.01)
(Continued)

(52) U.S. Cl.
CPC ............ H04N 5/272 (2013.01); G01S 17/06 (2013.01); G01S 17/89 (2013.01); H04N 5/2351 (2013.01); H04N 5/2352 (2013.01); H04N 7/157 (2013.01)

(58) Field of Classification Search
CPC .... H04N 5/272; H04N 5/2351; H04N 5/2352; H04N 7/157; H04N 7/142; H04N 7/147; G01S 17/06; G01S 17/89; G06V 10/00
See application file for complete search history.

(56) References Cited

U.S. PATENT DOCUMENTS 4,541,113 A 9/1985 Seufert et al.
4,747,148 A 5/1988 Watanabe et al.
(Continued)

FOREIGN PATENT DOCUMENTS

| CN | 103426143 B | 7/2016 |
| CN | 104063858 B | 4/2017 |
| CN | 105141858 B | 10/2018 |

OTHER PUBLICATIONS

"High Performance Imaging Solutions Multispectral Imaging Specialists" Mar. 2017, 6 pages.
(Continued)

Primary Examiner — Luong T Nguyen
(74) Attorney, Agent, or Firm — Patterson & Sheridan, LLP

(57) ABSTRACT

Embodiments of the disclosure provided herein generally relate to methods and video system components that have integrated background differentiation capabilities that allow for background replacement and/or background modification. In some embodiments, undesired portions of video data generated in a video environment are separated from desired portions of the video data by taking advantage of the illumination and decay of the intensity of electromagnetic radiation, provided from an illuminator, over a distance. Due to the decay of intensity with distance, the electromagnetic radiation reflected from the undesired background has a lower intensity when received by the sensor than the electromagnetic radiation reflected from the desired foreground. The difference in the detected intensity at the one or more wavelengths can then be used to separate and/or modify the undesired background from the desired foreground for use in a video feed.

20 Claims, 15 Drawing Sheets

(51) Int. Cl.
*G01S 17/89* (2020.01)
*H04N 7/15* (2006.01)
*H04N 5/235* (2006.01)

(56) References Cited

U.S. PATENT DOCUMENTS

| | | |
|---|---|---|
| 5,001,558 A | 3/1991 | Burley et al. |
| 5,022,085 A | 6/1991 | Cok |
| 5,117,283 A | 5/1992 | Kroos et al. |
| 5,175,775 A | 12/1992 | Iwaki et al. |
| 5,222,155 A | 6/1993 | Delanoy et al. |
| 5,227,985 A | 7/1993 | DeMenthon |
| 5,343,311 A | 8/1994 | Morag et al. |
| 5,369,430 A | 11/1994 | Kitamura |
| 5,495,535 A | 2/1996 | Smilansky et al. |
| 5,500,906 A | 3/1996 | Picard et al. |
| 5,506,946 A | 4/1996 | Bar et al. |
| 5,517,334 A | 5/1996 | Morag et al. |
| 5,534,917 A | 7/1996 | MacDougall |
| 5,581,276 A | 12/1996 | Cipolla et al. |
| 5,631,697 A | 5/1997 | Nishimura et al. |
| 5,633,951 A | 5/1997 | Moshfeghi |
| 5,668,605 A | 9/1997 | Nachshon et al. |
| 5,682,557 A | 10/1997 | Harada et al. |
| 5,687,306 A | 11/1997 | Blank |
| 5,710,829 A | 1/1998 | Chen et al. |
| 5,740,266 A | 4/1998 | Weiss et al. |
| 5,781,659 A | 7/1998 | Melen et al. |
| 5,875,040 A | 2/1999 | Matraszek et al. |
| 5,901,245 A | 5/1999 | Warnick et al. |
| 5,923,380 A * | 7/1999 | Yang .............. H04N 5/272 348/590 |
| 5,953,076 A | 9/1999 | Astle et al. |
| 6,119,147 A | 9/2000 | Toomey et al. |
| 6,150,930 A | 11/2000 | Cooper |
| 6,154,574 A | 11/2000 | Paik et al. |
| 6,411,744 B1 | 6/2002 | Edwards |
| 6,490,006 B1 * | 12/2002 | Monjo .............. H04N 5/272 348/592 |
| 6,618,444 B1 | 9/2003 | Haskell et al. |
| 6,636,635 B2 | 10/2003 | Matsugu |
| 6,646,687 B1 | 11/2003 | Vlahos |
| 6,661,918 B1 | 12/2003 | Gordon et al. |
| 6,664,973 B1 | 12/2003 | Iwamoto et al. |
| 6,754,367 B1 | 6/2004 | Ito et al. |
| 6,760,749 B1 | 7/2004 | Dunlap et al. |
| 6,785,014 B1 | 8/2004 | Nishikawa |
| 6,798,407 B1 | 9/2004 | Benman |
| 6,836,345 B1 | 12/2004 | Setchell |
| 6,876,768 B1 | 4/2005 | Kawade |
| 6,895,520 B1 | 5/2005 | Altmejd et al. |
| 6,937,744 B1 | 8/2005 | Toyama |
| 6,952,286 B2 | 10/2005 | Luo et al. |
| 6,993,190 B1 | 1/2006 | Nguyen |
| 7,020,335 B1 | 3/2006 | Abousleman |
| 7,050,070 B2 | 5/2006 | Ida et al. |
| 7,124,164 B1 | 10/2006 | Chemtob |
| 7,188,357 B1 | 3/2007 | Rieschl et al. |
| 7,209,163 B1 | 4/2007 | Ono |
| 7,317,830 B1 | 1/2008 | Gordon et al. |
| 7,386,799 B1 | 6/2008 | Clanton et al. |
| 7,420,490 B2 | 9/2008 | Gupta et al. |
| 7,420,590 B2 | 9/2008 | Matusik et al. |
| 7,451,474 B1 | 11/2008 | McBreen et al. |
| 7,463,296 B2 | 12/2008 | Sun et al. |
| 7,512,262 B2 | 3/2009 | Criminisi et al. |
| 7,518,051 B2 | 4/2009 | Redmann |
| 7,574,043 B2 | 8/2009 | Porikli |
| 7,599,555 B2 | 10/2009 | McGuire et al. |
| 7,602,990 B2 | 10/2009 | Matusik et al. |
| 7,623,728 B2 | 11/2009 | Avinash et al. |
| 7,631,151 B2 | 12/2009 | Prahlad et al. |
| 7,633,511 B2 | 12/2009 | Shum et al. |
| 7,634,533 B2 | 12/2009 | Rudolph et al. |
| 7,650,058 B1 | 1/2010 | Garoutte |
| 7,653,256 B2 | 1/2010 | Kanda et al. |
| 7,657,171 B2 | 2/2010 | Sundstrom |
| 7,668,371 B2 | 2/2010 | Dorai et al. |
| 7,676,081 B2 | 3/2010 | Blake et al. |
| 7,692,664 B2 | 4/2010 | Weiss et al. |
| 7,720,283 B2 | 5/2010 | Sun et al. |
| 7,742,650 B2 | 6/2010 | Xu et al. |
| 7,742,894 B2 | 6/2010 | Chen et al. |
| 7,755,016 B2 | 7/2010 | Toda et al. |
| 7,773,136 B2 | 8/2010 | Ohyama et al. |
| 7,783,075 B2 | 8/2010 | Zhang et al. |
| 7,784,079 B1 | 8/2010 | Sipple et al. |
| 7,821,552 B2 | 10/2010 | Suzuki |
| 7,831,087 B2 | 11/2010 | Harville |
| 7,965,885 B2 | 6/2011 | Iwai |
| 8,026,945 B2 | 9/2011 | Garoutte et al. |
| 8,072,439 B2 | 12/2011 | Hillis et al. |
| 8,073,196 B2 | 12/2011 | Yuan et al. |
| 8,081,346 B1 | 12/2011 | Anup et al. |
| 8,094,928 B2 | 1/2012 | Graepel et al. |
| 8,146,005 B2 | 3/2012 | Jones et al. |
| 8,170,372 B2 | 5/2012 | Kennedy et al. |
| 8,175,379 B2 | 5/2012 | Wang et al. |
| 8,175,384 B1 | 5/2012 | Wang |
| 8,204,316 B2 | 6/2012 | Panahpour Tehrani et al. |
| 8,225,208 B2 | 7/2012 | Sprang et al. |
| 8,238,605 B2 | 8/2012 | Chien et al. |
| 8,245,260 B1 | 8/2012 | Sipple et al. |
| 8,249,333 B2 | 8/2012 | Agarwal et al. |
| 8,264,544 B1 | 9/2012 | Chang et al. |
| 8,300,890 B1 | 10/2012 | Gaikwad et al. |
| 8,300,938 B2 | 10/2012 | Can et al. |
| 8,320,666 B2 | 11/2012 | Gong |
| 8,331,619 B2 | 12/2012 | Ikenoue |
| 8,331,685 B2 | 12/2012 | Pettigrew et al. |
| 8,335,379 B2 | 12/2012 | Malik |
| 8,345,082 B2 | 1/2013 | Tysso |
| 8,346,006 B1 | 1/2013 | Darbari et al. |
| 8,355,379 B2 | 1/2013 | Thomas et al. |
| 8,363,908 B2 | 1/2013 | Steinberg et al. |
| 8,379,101 B2 | 2/2013 | Mathe et al. |
| 8,396,328 B2 | 3/2013 | Sandrew et al. |
| 8,406,470 B2 | 3/2013 | Jones et al. |
| 8,406,494 B2 | 3/2013 | Zhan et al. |
| 8,411,149 B2 | 4/2013 | Maison et al. |
| 8,411,948 B2 | 4/2013 | Rother et al. |
| 8,422,769 B2 | 4/2013 | Rother et al. |
| 8,437,570 B2 | 5/2013 | Criminisi et al. |
| 8,446,459 B2 | 5/2013 | Fang et al. |
| 8,472,747 B2 | 6/2013 | Sasaki et al. |
| 8,488,896 B2 | 7/2013 | Shi et al. |
| 8,503,720 B2 | 8/2013 | Shotton et al. |
| 8,533,593 B2 | 9/2013 | Grossman et al. |
| 8,533,594 B2 | 9/2013 | Grossman et al. |
| 8,533,595 B2 | 9/2013 | Grossman et al. |
| 8,565,485 B2 | 10/2013 | Craig et al. |
| 8,588,515 B2 | 11/2013 | Bang et al. |
| 8,625,897 B2 | 1/2014 | Criminisi et al. |
| 8,643,701 B2 | 2/2014 | Nguyen et al. |
| 8,649,592 B2 | 2/2014 | Nguyen et al. |
| 8,649,932 B2 | 2/2014 | Mian et al. |
| 8,655,069 B2 | 2/2014 | Rother et al. |
| 8,659,658 B2 | 2/2014 | Vassigh et al. |
| 8,666,153 B2 | 3/2014 | Hung et al. |
| 8,670,616 B2 | 3/2014 | Hamada |
| 8,681,380 B2 | 3/2014 | Kuwata et al. |
| 8,682,072 B2 | 3/2014 | Sengamedu et al. |
| 8,701,002 B2 | 4/2014 | Grossman et al. |
| 8,723,914 B2 | 5/2014 | Mackie et al. |
| 8,787,675 B2 | 7/2014 | Makino et al. |
| 8,805,065 B2 | 8/2014 | Dai |
| 8,818,028 B2 | 8/2014 | Nguyen et al. |
| 8,831,285 B2 | 9/2014 | Kang |
| 8,849,017 B2 | 9/2014 | Ito et al. |
| 8,854,412 B2 | 10/2014 | Tian et al. |
| 8,874,525 B2 | 10/2014 | Grossman et al. |
| 8,890,923 B2 | 11/2014 | Tian et al. |
| 8,890,929 B2 | 11/2014 | Paithankar et al. |
| 8,897,562 B2 | 11/2014 | Bai et al. |

(56) References Cited

U.S. PATENT DOCUMENTS

| | | |
|---|---|---|
| 8,913,847 B2 | 12/2014 | Tang et al. |
| 8,994,778 B2 | 3/2015 | Weiser et al. |
| 9,008,457 B2 | 4/2015 | Dikmen et al. |
| 9,053,573 B2 | 6/2015 | Lin et al. |
| 9,065,973 B2 | 6/2015 | Graham et al. |
| 9,083,850 B1 | 7/2015 | Higgs |
| 9,084,928 B2 | 7/2015 | Klang |
| 9,087,229 B2 | 7/2015 | Nguyen et al. |
| 9,088,692 B2 | 7/2015 | Carter et al. |
| 9,117,310 B2 | 8/2015 | Coene et al. |
| 9,153,066 B2 | 10/2015 | Ishii |
| 9,215,467 B2 | 12/2015 | Cheok et al. |
| 9,245,197 B2 | 1/2016 | Hikida |
| 9,269,153 B2 | 2/2016 | Gandolph et al. |
| 9,282,285 B2 | 3/2016 | Winterstein et al. |
| 9,285,951 B2 | 3/2016 | Makofsky et al. |
| 9,286,658 B2 | 3/2016 | Bhaskaran |
| 9,336,610 B2 | 5/2016 | Ohashi et al. |
| 9,355,325 B2 * | 5/2016 | Vonolfen ............... G06V 10/26 |
| 9,560,259 B2 | 1/2017 | Tu |
| 9,619,705 B1 | 4/2017 | Nordstrom |
| 9,626,795 B2 | 4/2017 | Sathe |
| 9,628,722 B2 | 4/2017 | Do et al. |
| 9,659,658 B2 | 5/2017 | Kim |
| 9,773,155 B2 | 9/2017 | Shotton et al. |
| 9,773,296 B2 | 9/2017 | Hiasa |
| 9,787,938 B2 | 10/2017 | Cranfill et al. |
| 9,881,359 B2 | 1/2018 | Liu |
| 9,886,945 B1 | 2/2018 | Sieracki |
| 9,948,893 B2 * | 4/2018 | Barzuza ............... H04L 65/403 |
| 10,026,012 B2 | 7/2018 | Zhu et al. |
| 10,110,792 B2 | 10/2018 | Benson |
| 10,181,178 B2 | 1/2019 | Cutler et al. |
| 10,185,416 B2 | 1/2019 | Mistry et al. |
| 10,194,060 B2 | 1/2019 | Mistry et al. |
| 10,419,703 B2 | 9/2019 | Goma et al. |
| 10,423,214 B2 | 9/2019 | Mistry et al. |
| 10,477,184 B2 | 11/2019 | Surma et al. |
| 10,504,246 B2 | 12/2019 | Rossato et al. |
| 10,551,928 B2 | 2/2020 | Mistry et al. |
| 10,582,198 B2 | 3/2020 | Hannuksela et al. |
| 10,614,562 B2 | 4/2020 | Mannar et al. |
| 10,621,697 B2 | 4/2020 | Chou et al. |
| 10,671,658 B2 | 6/2020 | Case et al. |
| 10,691,332 B2 | 6/2020 | Offenberg et al. |
| 10,692,199 B2 | 6/2020 | Sun |
| 10,742,954 B2 | 8/2020 | Chan et al. |
| 10,789,725 B2 | 9/2020 | Segman |
| 10,796,070 B2 | 10/2020 | Srivastava et al. |
| 10,848,748 B2 | 11/2020 | Handa et al. |
| 10,897,614 B2 | 1/2021 | Hannuksela et al. |
| 2001/0005222 A1 | 6/2001 | Yamaguchi |
| 2001/0036317 A1 | 11/2001 | Mori |
| 2002/0015186 A1 | 2/2002 | Nagata |
| 2002/0031262 A1 | 3/2002 | Imagawa et al. |
| 2002/0031265 A1 | 3/2002 | Higaki |
| 2002/0051491 A1 | 5/2002 | Challapali et al. |
| 2002/0051571 A1 | 5/2002 | Jackway et al. |
| 2002/0080148 A1 | 6/2002 | Uchino |
| 2002/0154820 A1 | 10/2002 | Kaneko et al. |
| 2002/0158873 A1 | 10/2002 | Williamson |
| 2002/0172433 A1 | 11/2002 | Edwards |
| 2003/0002746 A1 | 1/2003 | Kusaka |
| 2003/0004645 A1 | 1/2003 | Kochi |
| 2003/0007688 A1 | 1/2003 | Ono |
| 2003/0063669 A1 | 4/2003 | Lee et al. |
| 2003/0146884 A1 | 8/2003 | Heo |
| 2003/0161007 A1 | 8/2003 | Maurer et al. |
| 2003/0202120 A1 | 10/2003 | Mack |
| 2003/0206240 A1 | 11/2003 | Hyodo et al. |
| 2003/0231787 A1 | 12/2003 | Sumi |
| 2003/0234871 A1 | 12/2003 | Squilla et al. |
| 2004/0013315 A1 | 1/2004 | Li et al. |
| 2004/0047615 A1 | 3/2004 | Itoh |
| 2004/0062422 A1 | 4/2004 | Guichard |
| 2004/0098224 A1 | 5/2004 | Takahashi |
| 2004/0133927 A1 | 7/2004 | Sternberg et al. |
| 2004/0136593 A1 | 7/2004 | Chapoulaud |
| 2004/0151393 A1 | 8/2004 | Kurauchi |
| 2004/0153671 A1 | 8/2004 | Schuyler et al. |
| 2004/0161160 A1 | 8/2004 | Recht |
| 2004/0164972 A1 | 8/2004 | Carl |
| 2004/0184675 A1 | 9/2004 | Brown |
| 2004/0197028 A1 | 10/2004 | Lin et al. |
| 2004/0228505 A1 | 11/2004 | Sugimoto |
| 2004/0239596 A1 | 12/2004 | Ono et al. |
| 2004/0249557 A1 | 12/2004 | Harrington et al. |
| 2005/0012961 A1 | 1/2005 | Holt |
| 2005/0013490 A1 | 1/2005 | Rinne et al. |
| 2005/0053132 A1 | 3/2005 | Caball et al. |
| 2005/0093984 A1 | 5/2005 | Martins et al. |
| 2005/0105824 A1 | 5/2005 | Kesal et al. |
| 2005/0190981 A1 | 9/2005 | Fan et al. |
| 2005/0207661 A1 | 9/2005 | Miyagi et al. |
| 2005/0232493 A1 | 10/2005 | Satou et al. |
| 2005/0243350 A1 | 11/2005 | Aoyama |
| 2005/0271301 A1 | 12/2005 | Solomon et al. |
| 2005/0286743 A1 | 12/2005 | Kurzweil et al. |
| 2005/0286802 A1 | 12/2005 | Clark et al. |
| 2006/0008173 A1 | 1/2006 | Matsugu et al. |
| 2006/0013483 A1 | 1/2006 | Kurzweil et al. |
| 2006/0038894 A1 | 2/2006 | Chan et al. |
| 2006/0072022 A1 | 4/2006 | Iwai |
| 2006/0078217 A1 | 4/2006 | Poon et al. |
| 2006/0104479 A1 | 5/2006 | Bonch-Osmolovskiy et al. |
| 2006/0125799 A1 | 6/2006 | Hillis et al. |
| 2006/0159185 A1 | 7/2006 | D'Antonio et al. |
| 2006/0193509 A1 | 8/2006 | Criminisi et al. |
| 2006/0215766 A1 | 9/2006 | Wang et al. |
| 2006/0238444 A1 | 10/2006 | Wang et al. |
| 2006/0238445 A1 | 10/2006 | Wang et al. |
| 2006/0259552 A1 | 11/2006 | Mock et al. |
| 2006/0288313 A1 | 12/2006 | Hillis |
| 2007/0018966 A1 | 1/2007 | Blythe et al. |
| 2007/0025722 A1 | 2/2007 | Matsugu et al. |
| 2007/0036432 A1 | 2/2007 | Xu et al. |
| 2007/0046643 A1 | 3/2007 | Hillis et al. |
| 2007/0110298 A1 | 5/2007 | Graepel et al. |
| 2007/0127823 A1 | 6/2007 | Seeber |
| 2007/0133880 A1 | 6/2007 | Sun et al. |
| 2007/0154116 A1 | 7/2007 | Shieh |
| 2007/0165112 A1 | 7/2007 | Shinmei et al. |
| 2007/0223819 A1 | 9/2007 | Yamamoto |
| 2007/0263903 A1 | 11/2007 | St. Hilaire et al. |
| 2007/0269135 A1 | 11/2007 | Ono |
| 2008/0002961 A1 | 1/2008 | Sundstrom |
| 2008/0037869 A1 | 2/2008 | Zhou |
| 2008/0109724 A1 | 5/2008 | Gallmeier et al. |
| 2008/0123960 A1 | 5/2008 | Kim et al. |
| 2008/0181507 A1 | 7/2008 | Gope et al. |
| 2008/0240507 A1 | 10/2008 | Niwa et al. |
| 2008/0246777 A1 | 10/2008 | Swanson et al. |
| 2008/0266380 A1 | 10/2008 | Gorzynski et al. |
| 2008/0273751 A1 | 11/2008 | Yuan et al. |
| 2008/0310742 A1 | 12/2008 | Kostrzewski et al. |
| 2008/0317295 A1 | 12/2008 | Koutaki |
| 2009/0003687 A1 | 1/2009 | Agarwal et al. |
| 2009/0034866 A1 | 2/2009 | Park et al. |
| 2009/0044113 A1 | 2/2009 | Jones et al. |
| 2009/0109280 A1 | 4/2009 | Gotsman et al. |
| 2009/0138805 A1 | 5/2009 | Hildreth |
| 2009/0180002 A1 | 7/2009 | Suekane |
| 2009/0199111 A1 | 8/2009 | Emori et al. |
| 2009/0219302 A1 | 9/2009 | Li et al. |
| 2009/0244309 A1 | 10/2009 | Maison et al. |
| 2009/0245571 A1 | 10/2009 | Chien et al. |
| 2009/0249863 A1 | 10/2009 | Kim et al. |
| 2009/0279779 A1 | 11/2009 | Dunton et al. |
| 2009/0284627 A1 | 11/2009 | Bando |
| 2010/0014752 A1 | 1/2010 | Ishigami et al. |
| 2010/0046830 A1 | 2/2010 | Wang |
| 2010/0053212 A1 | 3/2010 | Kang |
| 2010/0110183 A1 | 5/2010 | Bobbitt et al. |
| 2010/0114671 A1 | 5/2010 | Bobbitt et al. |

(56) References Cited

U.S. PATENT DOCUMENTS

| | | |
|---|---|---|
| 2010/0114746 A1 | 5/2010 | Bobbitt et al. |
| 2010/0118116 A1 | 5/2010 | Tomasz |
| 2010/0118125 A1 | 5/2010 | Park |
| 2010/0128927 A1 | 5/2010 | Ikenoue |
| 2010/0134624 A1 | 6/2010 | Bobbitt et al. |
| 2010/0134625 A1 | 6/2010 | Bobbitt et al. |
| 2010/0142832 A1 | 6/2010 | Nafarieh et al. |
| 2010/0165081 A1 | 7/2010 | Jung et al. |
| 2010/0195898 A1 | 8/2010 | Bang et al. |
| 2010/0283837 A1 | 11/2010 | Oohchida et al. |
| 2010/0296572 A1 | 11/2010 | Ramaswamy et al. |
| 2010/0302376 A1 | 12/2010 | Boulanger et al. |
| 2011/0054870 A1 | 3/2011 | Dariush et al. |
| 2011/0090246 A1 | 4/2011 | Matsunaga |
| 2011/0169921 A1 | 7/2011 | Lee et al. |
| 2011/0193939 A1 | 8/2011 | Vassigh et al. |
| 2011/0242277 A1 | 10/2011 | Do et al. |
| 2011/0249863 A1 | 10/2011 | Ohashi et al. |
| 2011/0249883 A1 | 10/2011 | Can et al. |
| 2012/0093360 A1 | 4/2012 | Subramanian et al. |
| 2012/0133746 A1 | 5/2012 | Bigioi et al. |
| 2012/0201470 A1 | 8/2012 | Pekar et al. |
| 2012/0236937 A1 | 9/2012 | Kameyama |
| 2012/0250993 A1 | 10/2012 | Iso et al. |
| 2012/0275718 A1 | 11/2012 | Takamori et al. |
| 2012/0294510 A1 | 11/2012 | Zhang et al. |
| 2012/0309532 A1 | 12/2012 | Ambrus et al. |
| 2012/0314077 A1 | 12/2012 | Clavenna, II et al. |
| 2012/0321173 A1 | 12/2012 | Mitarai et al. |
| 2013/0003128 A1 | 1/2013 | Watanabe |
| 2013/0016097 A1 | 1/2013 | Coene et al. |
| 2013/0110565 A1 | 5/2013 | Means, Jr. et al. |
| 2013/0129205 A1 | 5/2013 | Wang et al. |
| 2013/0142452 A1 | 6/2013 | Shionozaki et al. |
| 2013/0243313 A1 | 9/2013 | Civit et al. |
| 2014/0003719 A1 | 1/2014 | Bai et al. |
| 2014/0029788 A1 | 1/2014 | Kang |
| 2014/0112530 A1 | 4/2014 | Yadani et al. |
| 2014/0112547 A1 | 4/2014 | Peeper et al. |
| 2014/0119642 A1 | 5/2014 | Lee et al. |
| 2014/0153784 A1 | 6/2014 | Gandolph et al. |
| 2014/0153833 A1 | 6/2014 | Miyakoshi et al. |
| 2014/0229850 A1 | 8/2014 | Makofsky et al. |
| 2014/0300630 A1 | 10/2014 | Flider et al. |
| 2014/0300702 A1 | 10/2014 | Saydkhuzhin et al. |
| 2014/0307056 A1 | 10/2014 | Collet Romea et al. |
| 2014/0354759 A1 | 12/2014 | Cranfill et al. |
| 2015/0040066 A1 | 2/2015 | Baron et al. |
| 2015/0117775 A1 | 4/2015 | Abe et al. |
| 2015/0243041 A1 | 8/2015 | Panetta et al. |
| 2015/0244946 A1 | 8/2015 | Agaian et al. |
| 2015/0249829 A1 | 9/2015 | Koat et al. |
| 2015/0348458 A1 | 12/2015 | Tian et al. |
| 2016/0173789 A1 | 6/2016 | Xu et al. |
| 2016/0189355 A1 | 6/2016 | Basche et al. |
| 2017/0223234 A1 | 8/2017 | Do et al. |
| 2018/0332239 A1 | 11/2018 | Peterson et al. |
| 2019/0208119 A1 | 7/2019 | Ekstrand et al. |
| 2019/0318460 A1 | 10/2019 | Bouzaraa et al. |
| 2020/0258192 A1 | 8/2020 | Liu et al. |
| 2020/0322591 A1 | 10/2020 | Yano et al. |

OTHER PUBLICATIONS

Hu et al., "Convolutional Sparse Coding for RGB+NIR Imaging" available at https://www.cs.princeton.edu/~fheide/papers/ConvolutionalRGBNIR.pdf, Apr. 2018, 15 pages.

Soria et al., "Wide-Band Color Imagery Restoration for RGB-NIR Single Sensor Images" available at https://www.ncbi.nlm.nih.gov/pmc/articles/PMC6068539/pdf/sensors-18-02059.pdf, Jun. 2018, 17 pages.

Matthew Buzzi, Nvidia Adds Digital Green Screen, Gaming Latency Reduction for Streaming, Esports. Sep. 1, 2020. https://www.pcmag.com/news/nvidia-adds-digital-green-screen-gaming-latency-reduction-for-streaming.

Mark Murphy et al. "Lens Drivers Focus on Performance in High-Resolution Camera Modules" http://www.analog.com/analogdialogue. Nov. 2006.

Robert M. Haralick et al. "Survey, Image Segmentation Techniques" May 26, 1982. Computer Vision, Graphics, and Image Processing 29, 100-132.

Nobuo Ilzuka, "Image Sensor Communication—Current Status and Future Perspectives", IEICE Trans, Commun., vol. E.100-B, No. 6 Jun. 2017. p. 911-916.

"Visual Tracking and Segmentation Using Time-of-Flight Sensor", Conference Paper in Proceedings/ICIP . . . International Conference on Image Processing. Oct. 2010. 5 pages.

David Henderson, "Focus: Industrial strength, smartphone sensibilities", Special Lighting & Optoelectronics. www2.electronicproducts.com. May 2012.

Jingtang Liao et al. "Depth Map Design and Depth-based Effects with a Single Image" Delft University of Technology. 7 pages, Jan. 6, 2017.

Jie Gong et al. "Using Depth Mapping to realize Bokeh effect with a single camera Android device", Final Project for Autumn 2016-2017, Report for Student-Proposed Project #30, EE368/CS232 Digital Imaging Processing, Stanford University, 10 pages.

* cited by examiner

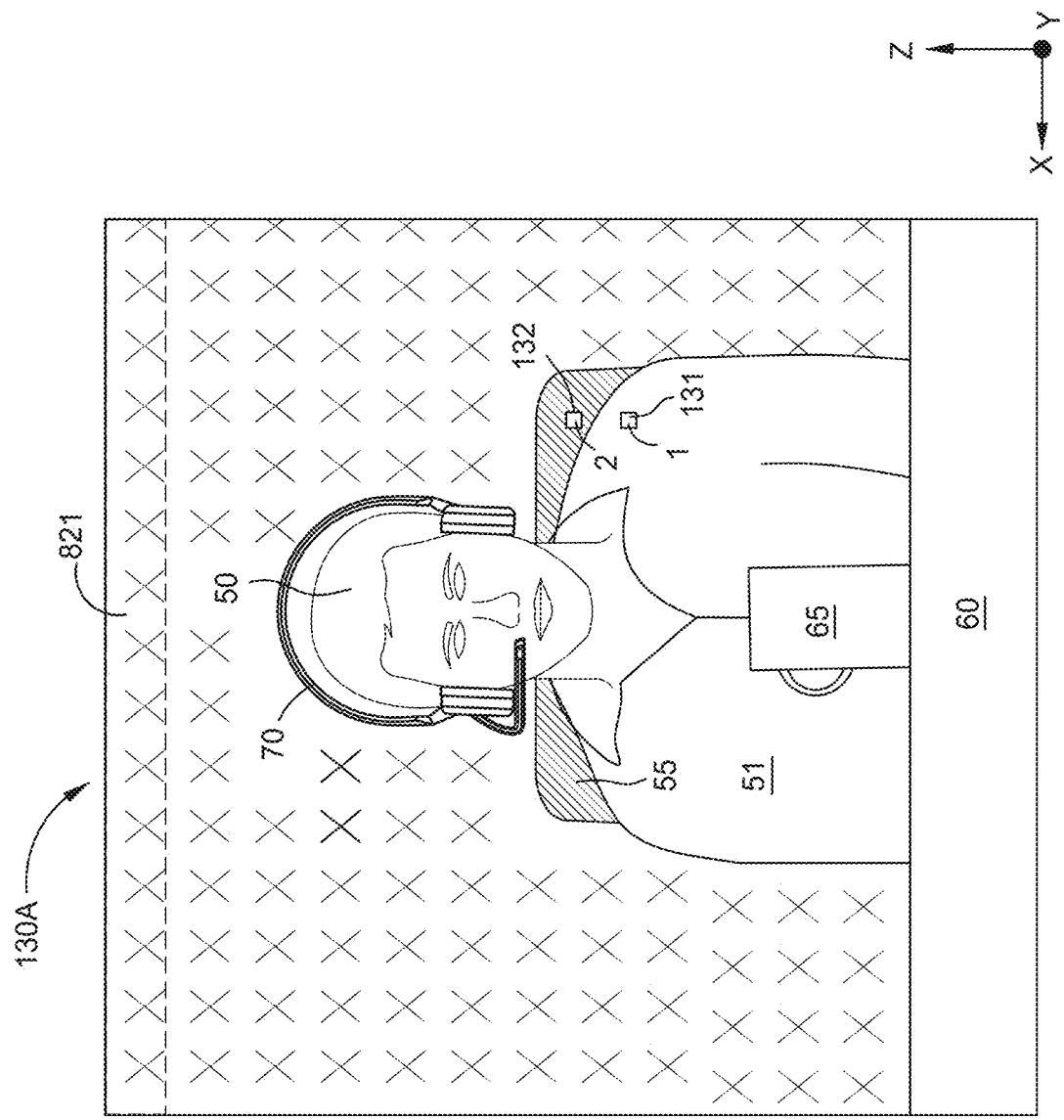

IMAGE GENERATING SYSTEM WITH BACKGROUND REPLACEMENT OR MODIFICATION CAPABILITIES

CROSS-REFERENCE TO RELATED APPLICATIONS

This application is a continuation of U.S. patent application Ser. No. 17/184,573, filed Feb. 24, 2021, which is herein incorporated by reference.

BACKGROUND

Field

Embodiments of the present disclosure generally relate to video generating systems, and more particularly, to video generating systems with background replacement or modification capabilities.

Description of the Related Art

Video generating systems (e.g., video conferencing equipment) have become more popular in recent years, due in large part to the declining costs of video generating equipment, the proliferation of high-speed Internet, and a global movement towards remote work situations. As familiarity with video generating systems increases, so does demand for more sophisticated video streaming features, such as background removal, modification, and/or replacement schemes for these video applications.

Conventional methods of background replacement rely on chroma key compositing where two or more video streams are layered together based on a color hues. Chroma key compositing requires the use of a monochrome background screen, e.g., a green screen, and an even bright lighting to avoid shadows, which might otherwise present as a darker color and not register for replacement, and to prevent undesirably high amounts of noise by providing a bright and unsaturated image. However, chroma key compositing is generally disfavored for occasional use, such as individual video conferencing use, due to the unwieldy and unattractive nature of required background screens and due to the expensive professional level lighting requirements associated therewith.

Due to the undesirability of chroma key compositing for individual use, such as with a remote work situation, users have shown increasing interest in virtual backgrounds. Virtual background schemes typically provide background removal, modification, and/or replacement using a software executed on a user device, e.g., a personal computer, a laptop, or a gaming console.

Unfortunately, the cost, time, and technical complexity of implementing conventional virtual background replacement has proven prohibitive to potential users who may otherwise desire the privacy and other benefits afforded thereby. For example, users of such virtual background schemes frequently complain (1) that the increased computing power requirements may be more than is available for a typical individual remote office setup, (2) that the virtual background replacement software may be incompatible for use with readily available video generating software, such as readily available video conferencing software applications, and (3) that the software introduces an undesirable lag to a live video stream and/or to the separation of the user from the background.

Accordingly, there is a need in the art for video generating equipment (e.g., video conferencing equipment) and related methods that solve the problems described above.

SUMMARY

Embodiments herein generally relate to video generating systems, and more particularly, to advanced camera devices with integrated background differentiation capabilities, such as background removal, background replacement, and/or background blur capabilities, suitable for use in a video application (e.g., video conferencing).

Embodiments of the disclosure include a method of generating an image by receiving, by one or more sensors, electromagnetic radiation from a first environment, wherein the electromagnetic radiation comprises radiation within a first range of wavelengths and radiation within a second range of wavelengths, generating visible image data from the electromagnetic radiation received in the first range of wavelengths, detecting, by a first sensor of the one or more sensors, an intensity of the electromagnetic radiation received in the second range of wavelengths from the first environment, identifying a first portion of the first environment based on values relating to the detected intensity of the electromagnetic radiation received in the second range of wavelengths, generating a first subset of the visible image data based on the identification of the first portion of the first environment, wherein the first subset of the visible image data corresponds to visible image data configured to generate a visible image of the first portion of the first environment, and generating a first visible image of the first portion of the first environment from the first subset of the visible image data.

Embodiments of the disclosure further include a camera device for use with a video streaming system, the camera device including a lens, one or more sensors configured to generate image data from electromagnetic radiation received from a first environment, a controller comprising a processor and a non-transitory computer readable medium that includes instructions which when executed by the processor are configured to cause the camera device to: receive, by the one or more sensors, electromagnetic radiation from the first environment, wherein the electromagnetic radiation comprises radiation within a first range of wavelengths and radiation within a second range of wavelengths; generate visible image data from the electromagnetic radiation received in the first range of wavelengths; detect, by a first sensor of the one or more sensors, an intensity of the electromagnetic radiation received in the second range of wavelengths from the first environment; identify a first portion of the first environment based on values relating to the detected intensity of the electromagnetic radiation received in the second range of wavelengths; generate a first subset of the visible image data based on the identification of the first portion of the first environment, wherein the first subset of the visible image data corresponds to visible image data configured to generate a visible image of the first portion of the first environment; and generate a first visible image of the first portion of the first environment from the first subset of the visible image data.

Embodiments of the disclosure further include a method of generating an image, comprising the following operations. Receiving, on a plurality of sensing elements of a sensor array, electromagnetic radiation during a first time period from a first environment, wherein the electromagnetic radiation comprises radiation within a first range of wavelengths and radiation within a second range of wavelengths. Generating, during a second time period, a first set of visible image data in response to the electromagnetic radiation received in the first range of wavelengths on a first portion of the sensor array during the first time period. Generating, during the second time period, a first set of electromagnetic image data in response to the electromagnetic radiation received in the second range of wavelengths on the first portion of the sensor array during the first time period, wherein the first set of electromagnetic image data includes information relating to the intensities of the electromagnetic radiation in the second range of wavelengths received at the first portion of the sensor array during the first time period. Replacing or modifying at least some of the first set of visible image data generated during the second time period based on the first set of electromagnetic image data generated during the second time period. Then, generating, during a third time period, a second set of visible image data in response to the electromagnetic radiation received in the first range of wavelengths on a second portion of the sensor array during the first time period, wherein the second time period occurs after the first time period, and the third time period occurs after the second time period.

Embodiments of the disclosure further include a camera device for use with a video streaming system, the camera device comprising a lens, a sensor including a sensor array configured to generate image data from electromagnetic radiation received from a first environment, and a controller comprising a processor and a non-transitory computer readable medium that includes instructions stored therein. The instructions which when executed by the processor are configured to cause the camera device to receive, on a plurality of sensing elements of the sensor array, electromagnetic radiation during a first time period from a first environment, wherein the electromagnetic radiation comprises radiation within a first range of wavelengths and radiation within a second range of wavelengths, generate, during a second time period, a first set of visible image data in response to the electromagnetic radiation received in the first range of wavelengths on a first portion of the sensor array during the first time period, generate, during the second time period, a first set of electromagnetic image data in response to the electromagnetic radiation received in the second range of wavelengths on the first portion of the sensor array during the first time period, wherein the first set of electromagnetic image data includes information relating to the intensities of the electromagnetic radiation in the second range of wavelengths received at the first portion of the sensor array during the first time period, replace or modify at least some of the first set of visible image data generated during the second time period based on the first set of electromagnetic image data generated during the second time period; and generate, during a third time period, a second set of visible image data in response to the electromagnetic radiation received in the first range of wavelengths on a second portion of the sensor array during the first time period, wherein the second time period occurs after the first time period, and the third time period occurs after the second time period.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A is a modified visible image of the local environment, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
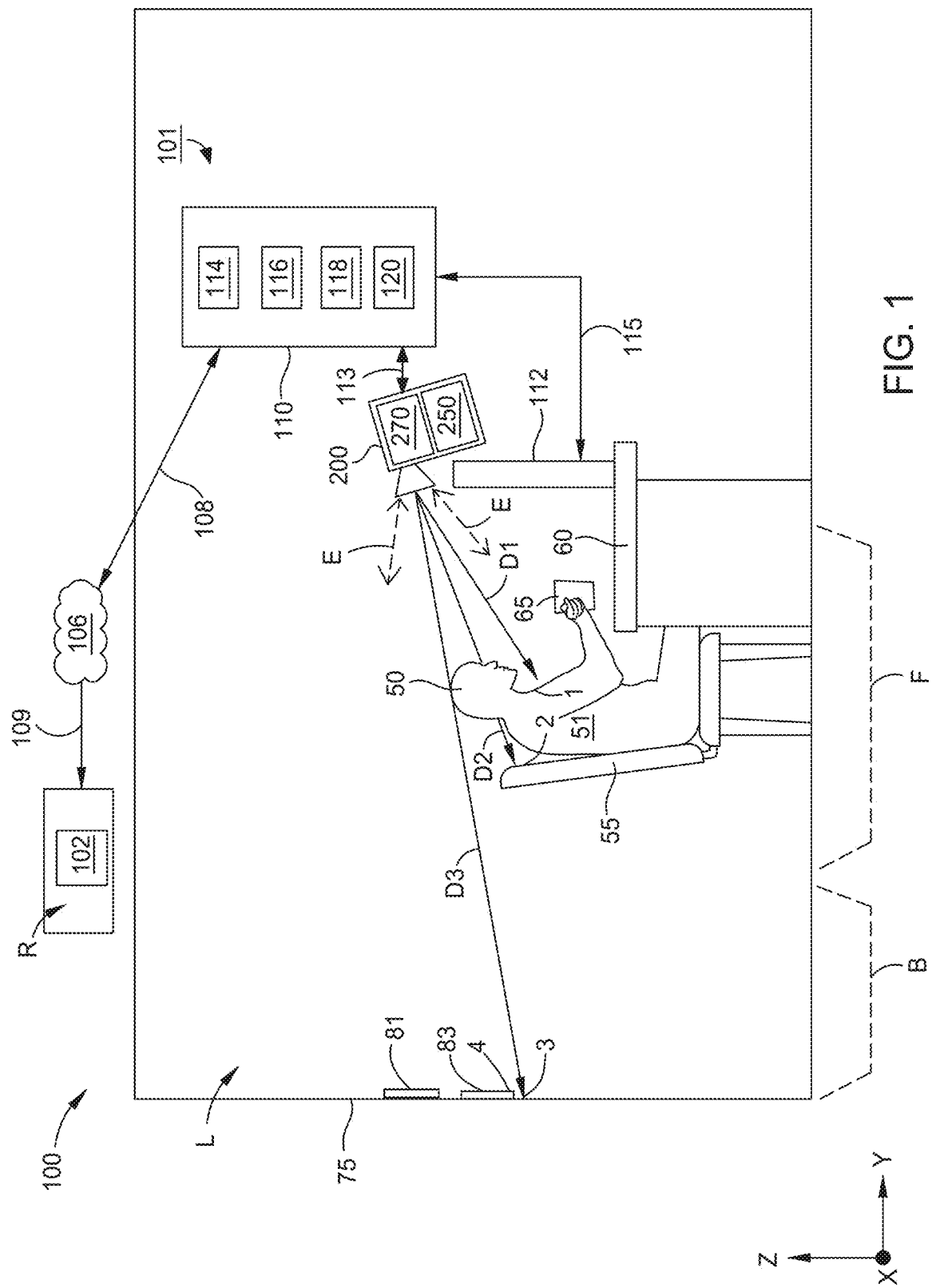
FIG. 1 is a schematic representation of a video conferencing system, according to one embodiment.

Embodiments herein generally relate to video generating systems, and more particularly, to video generating equipment with integrated background differentiation capabilities, such as background replacement and/or background modification, which are suitable for use in video applications, such as video conferencing applications. Although the following disclosure is largely described in reference to video conferencing systems and related methods, the benefits of the disclosure are not limited to video conferencing applications and can be applied to any system or method in which video is generated, such as video streaming, video recording, and videotelephony. Furthermore, although the following is largely described in reference to repeatedly replacing or modifying a portion (e.g., a background) in a video stream, the benefits of these processes can also be applied to replacing or modifying a portion (e.g., a background) in one or more images that is less than a video stream, such as a single still image or a series of still images.

In the embodiments described below undesired portions of a video conference environment (e.g., a background behind a user) are separated from desired portions of the video conference environment (e.g., a foreground including the user(s)) in a video feed for a video conference by taking advantage of a decay of the intensity of generated electromagnetic radiation from an illuminator over a distance. An illuminator directs electromagnetic radiation (e.g., infrared radiation) having one or more wavelengths at the video conference environment. This electromagnetic radiation is then reflected back to a sensor. The undesired background is located at a greater distance from the sensor and illuminator compared to the desired foreground that includes the user(s). Because the intensity of the generated electromagnetic radiation decays with distance, the electromagnetic radiation reflected from the undesired background has a lower intensity when received by the sensor than the electromagnetic radiation reflected from the desired foreground. This difference in intensity at the one or more wavelengths can then be used to separate the undesired background from the desired foreground, for example on a pixel by pixel basis in an infrared image. After this separation, the undesired background in a corresponding visible image can then be modified (e.g., blurred) or removed and replaced with a different background, for example also on a pixel by pixel basis. By repeating this method, for example on a frame by frame basis, visible images of the desired foreground including the user(s) can then be transmitted along with the modified or replacement background as a video feed for the video conference.

In some embodiments, the background differentiation and/or background replacement methods are performed, using the camera device, before encoding the video stream for transmission of the video stream therefrom. By providing for pre-encoding and thus pre-compression background differentiation, the advanced camera devices described herein desirably avoid accumulated latencies that would otherwise propagate with a background replacement software executing on an operating system of a user device separate from, but communicatively coupled to, the camera device.

The pre-encoding and pre-compression background differentiation techniques disclosed herein will also reduce the amount of information that needs to be transmitted from the camera device due to removal of the unnecessary background information prior to transmission from the camera device. The techniques disclosed herein will reduce the hardware and data transmission protocol (e.g., USB 2.0 versus USB 3.0) requirements needed to transmit the relevant video conferencing information from the camera device to one or more external electronic devices. Therefore, removal of undesired information relating to the background from the video stream at the camera device substantially reduces the bandwidth otherwise required for transmission of an unmodified video stream. In some embodiments, the increased bandwidth availability provided by the advanced camera device may be used to provide the transmission of portions of higher resolution images, e.g., 4 k or more, between the advanced camera device and the user device while using less complex and lower cost data transmission hardware and transmission techniques. The background differentiation methods may be used with but are generally invisible to video conferencing software applications, such as Microsoft® Skype®, Apple® FaceTime® and applications available from Zoom® Video Communications, Inc, which advantageously facilitates seamless integration therewith. Furthermore, having the camera device perform the background replacement or modification can have security benefits as well. For example, when an image of a background including personal information is never transmitted from the camera device to another device, then the likelihood of this personal information falling into the wrong hands is substantially reduced. Moreover, as described below, in some embodiments, even the camera device itself never generates a visible image of the background because the camera device can generate the visible image on a pixel by pixel basis and in doing so can only generate visible image pixels of the video conference environment corresponding to areas of the video conference environment, such as the foreground, which have received an electromagnetic intensity above a given threshold. In such embodiments, in which a visible image of the background portion of the video conference environment is never generated, the security of any personal information in the background of the video conference environment is better preserved.

FIG. 1 is a schematic representation of a video conferencing system 100, according to one embodiment. The video conferencing system 100 enables a video conference to be performed between a user 50 in a local environment L and one or more users (not shown) in a remote environment R. The video conferencing system 100 includes a first video conferencing endpoint 101 at the local environment L and a second video conferencing endpoint 102 at the remote environment R. The first video conferencing endpoint 101 includes the equipment (e.g., camera, display, etc.) configured to perform the tasks associated with executing the video conference for the user 50 in the local environment L. Additional detail on this equipment is provided below. Similarly, the second video conferencing endpoint 102 includes the equipment configured to perform the tasks associated with executing the video conference for user(s) in the remote environment R.

The video conferencing system 100 further includes a network 106 that facilitates communication between the first video conferencing endpoint 101 and the second video conferencing endpoint 102. The network 106 generally represents any data communications network suitable for the transmission of video and audio data (e.g., the Internet). Corresponding communication links 108, 109 are used to support the transmission of video conference feeds that include audio and video streams between the respective video conferencing endpoints 101, 102 and the network 106. These communication links 108, 109 can be, for example, communication links to a Local Area Network (LAN) or a Wide Area Network (WAN).

The following describes how the first video conferencing endpoint 101 is used to modify or replace the background of the local environment L, but the description is applicable for modifying or replacing any video conferencing background with similar equipment and methods.

The first video conferencing endpoint 101 includes a user device 110, a display 112, and a camera device 200. The camera device 200 includes a sensor 250 and an illuminator 270. The illuminator 270 directs electromagnetic radiation E (e.g., infrared radiation) having one or more wavelengths at a portion of the local environment L. While not intending to be limiting as to the scope of the disclosure provided herein, for simplicity of the disclosure the intensity of the electromagnetic radiation emitted at the one or more wavelengths by the illuminator 270 is also sometimes referred to herein as the infrared radiation.

The generated electromagnetic radiation E directed at the local environment L from the illuminator 270 reflects off of the surfaces in the local environment L. Portions of the reflected electromagnetic radiation are received by the sensor 250. As described in additional detail below, the sensor 250 is configured to (1) receive visible light for generating visible images of the local environment L and (2) detect intensities of the electromagnetic radiation E at the one or more wavelengths reflected from surfaces in the local environment L. Used herein, electromagnetic radiation used to generate a visible image is referred to as electromagnetic radiation within a first range of wavelengths. Similarly, the electromagnetic radiation directed from the illuminator is also referred to as electromagnetic radiation within a second range of wavelengths. In some embodiments, the first range of wavelengths and the second range of wavelengths are completely separate with no overlapping between the ranges, such as when the first range is in the visible spectrum and the second range is in a non-visible portion of the electromagnetic spectrum (e.g., the infrared spectrum). However, in other embodiments the first range and the second range can include some overlap. For example, some overlap can occur when the illuminator 270 emits radiation (i.e., radiation within the second range) and the visible image is generated mostly from visible light, but the visible image is also influenced by the radiation (e.g., near infrared radiation) emitted from the illuminator, such that the first range of wavelengths includes a range extending from visible light to one or more of the wavelength(s) emitted by the illuminator 270.

The differences in intensities of the electromagnetic radiation E received at the sensor 250 are then used to separate low-intensity regions of the local environment L (e.g., the background) from high-intensity regions of the local environment L (e.g., the foreground), so that visible images of the local environment L can be generated without the visible areas corresponding to the low-intensity regions of the local environment L or with a modified visible version (e.g., a blurred background) of the areas corresponding to the low-intensity regions of the local environment L.

The user device 110 represents any computing device capable of transmitting a video stream to a remote video conferencing device (e.g., the second video conferencing endpoint 102) via the communication link 108 that is in communication with the network 106. Examples of the user device 110 can include, without limitation, a laptop, a personal computer, a tablet, and a smart phone. The user device 110 includes a processor 114, a memory 116, support circuits 118, and a video conferencing application 120 stored in the memory 116. The memory 116 can include non-volatile memory to store the video conferencing application 120. The processor 114 can be used to execute the video conferencing software application 120 stored in the memory 116. Execution of the software application 120 can enable the user device 110 to transmit data (e.g., audio and video data) received from the equipment (e.g., the camera device 200) in the first video conferencing endpoint 101 to the second video conferencing endpoint 102 via the communication link 108. Additionally, execution of the software application 120 can also enable the user device 110 to receive data (e.g., audio and video data) from the second video conferencing endpoint 102, via the network 106 and the communication links 108, 109. Examples of video conferencing software application 120 include, without limitation, Microsoft® Skype®, Apple® FaceTime®, and applications available from Zoom® Video Communications, Inc. More generally, however, any video conferencing software application capable of receiving video data and transmitting video data to a remote site can be used, consistent with the functionality described herein. The user device 110 can further include audio speakers (not shown) for generating audio, for example audio of the user(s) speaking in the remote environment R, for the user 50 during the video conference.

In some embodiments, for example as shown in FIG. 1, the user device 110 can be used to display video data received from the second video conferencing endpoint 102, on the display 112 (e.g., LED television, OLED television, plasma display) during a video conference. In these embodiments, the user device 110 can communicate with the display using a communication link 115. In other embodiments, the user device 110 can include a native display, for example a laptop or tablet that includes a built-in display to enable video from the second video conferencing endpoint 102 to be displayed during the video conference.

The first video conferencing endpoint 101 can further include a communication link 113 for enabling communication between the camera device 200 and the user device 110. The communication link 113 may be wired or wireless. In some embodiments, the communication link 113 is a USB communication link selected from the industry standards of USB 2.0, 3.0, and 3.1 having one or more of a combination of type A, B, C, mini-A, mini-B, micro-A, and micro-B plugs.

In the local environment L, the user 50 is shown seated on a chair 55 at a desk 60. The user is holding a cup 65. The camera device 200 is positioned to view the user 50 and the user's surroundings. The local environment L further includes a back wall 75 located behind the user 50. The back wall 75 forms at least part of the undesired background that can be replaced or modified using the techniques described herein.

Figure 2A:
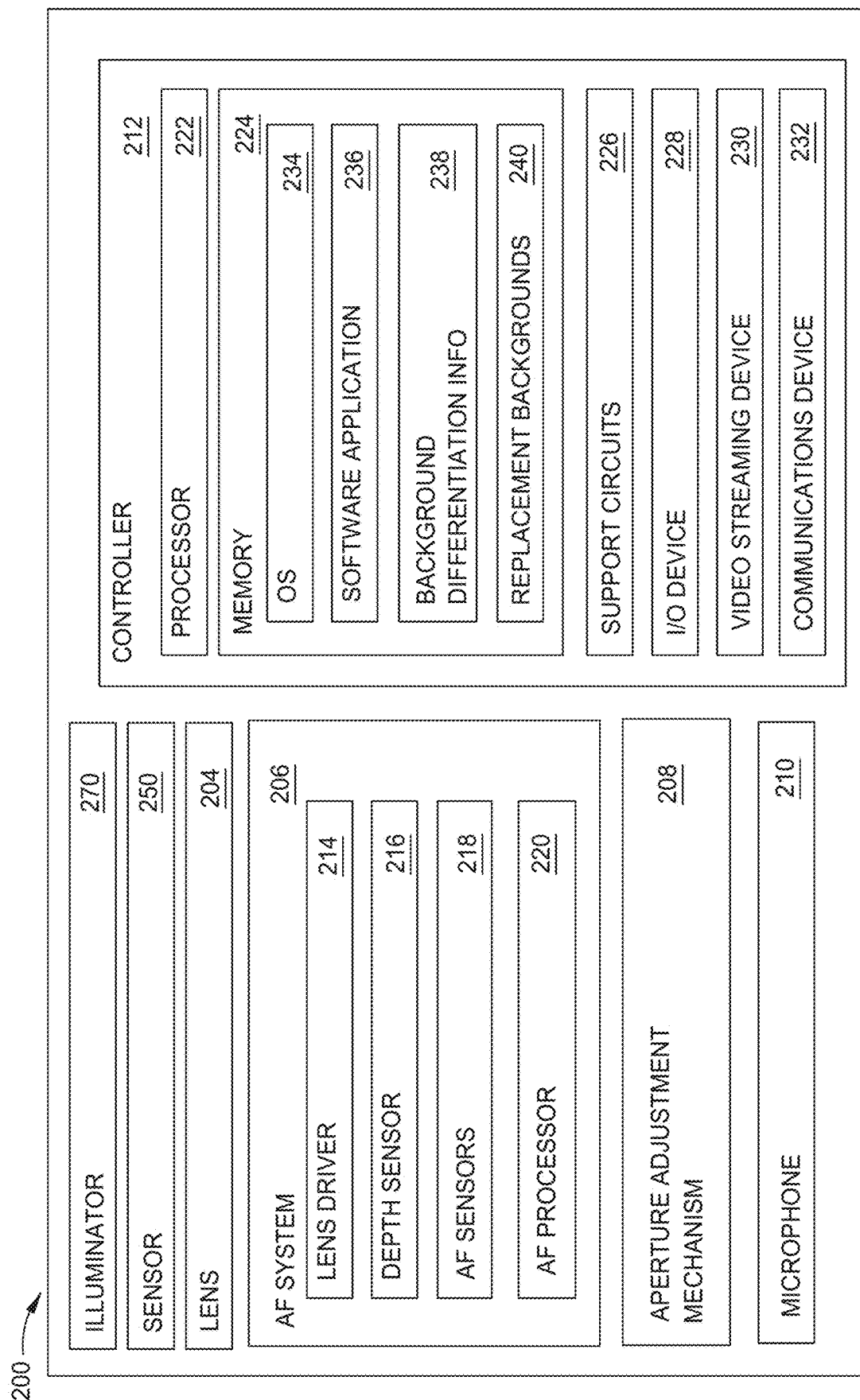
FIG. 2A is a schematic representation of the camera device shown in FIG. 1, according to one embodiment.
Figure 2B:
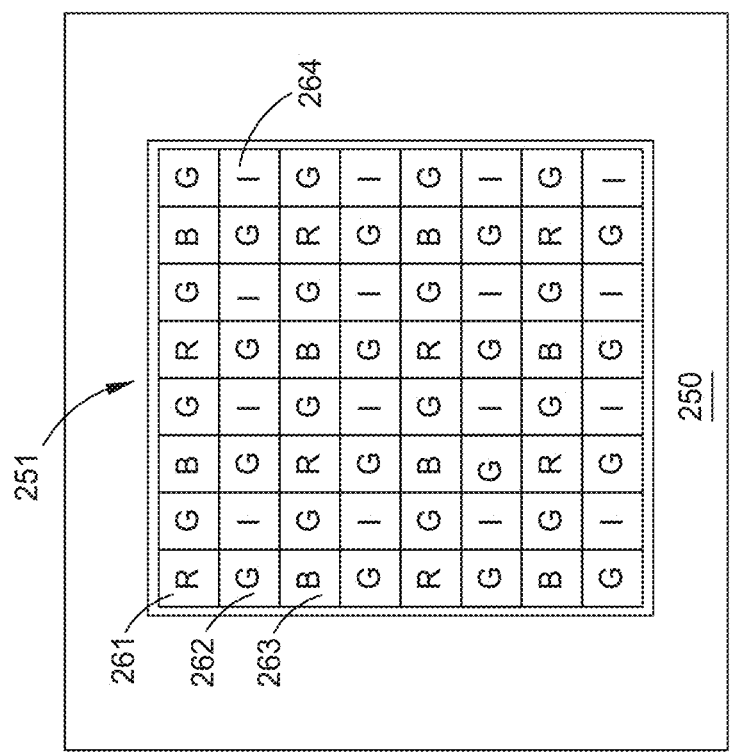
FIG. 2B illustrates an exemplary sensor array that can be used in the sensor of the camera device of FIG. 2A, according to one embodiment.

Before providing additional detail on the background modification and replacement performed by the camera device 200, the hardware features of the camera device 200 are described in reference to FIGS. 2A and 2B.

FIG. 2A is a schematic representation of the camera device 200 shown in FIG. 1, according to one embodiment. The camera device 200 includes the sensor 250 and the illuminator 270 shown in FIG. 1. Additionally, the camera device 200 includes a lens 204, an autofocus system 206, an aperture adjustment mechanism 208, a microphone 210, and a controller 212. The microphone 210 can be used to provide audio from the local environment L to the remote environment R during the video conference.

The illuminator 270 is configured to direct electromagnetic radiation E having one or more wavelengths at the local environment L. In general, the illuminator 270 is configured to deliver one or more wavelengths of electromagnetic energy to the local environment L that is characterized by a significant drop of intensity as a function of distance travelled from the energy source (i.e., the illuminator 270), such as electromagnetic wavelengths that are more strongly absorbed in air under normal atmospheric conditions. In some embodiments, the illuminator 270 is configured to deliver one or more wavelengths within the infrared range, such as one or more wavelengths from about 700 nm to about 1 mm. For example, in one embodiment, one or more wavelengths within the far-infrared range of 10 μm to 1 mm is emitted from the illuminator 270. In another embodiment, one or more wavelengths within the near-infrared spectrum range of 750 nm to 1400 nm is emitted from the illuminator 270. In one such embodiment, the illuminator 270 is configured to emit one or more wavelengths of energy from about 800 nm to about 950 nm, such as 850 nm and 900 nm. In other embodiments, forms of electromagnetic radiation other than infrared radiation can be directed from the illuminator.

Although much of this disclosure describes using an illuminator, such as the illuminator 270, and then detecting reflections of the electromagnetic radiation E emitted from the illuminator to perform the methods described herein, in some embodiments, the illuminator can be omitted. For example, in one embodiment, one or more sensors are configured to detect ambient levels of infrared energy, such as infrared energy emitted as a result of a user's body heat and infrared energy emitted from surrounding objects. The intensity of infrared energy emitted from user(s) and objects in the video conference environment also decays with distance in the same way that the reflected electromagnetic radiation E emitted from the illuminator 270 decays with distance, and thus the methods described herein can also be applied to perform background replacement or modification when an illuminator is not used. In one embodiment in which the illuminator is omitted, an infrared sensor configured to detect infrared energy from about 900 nm to about 2500 nm can be used to perform the methods described herein. Although the illuminator can be omitted, the remainder of the disclosure is described with reference to embodiments in which an illuminator, such as the illuminator 270, is used.

The sensor 250 is configured to (1) receive visible light for generating visible images and (2) detect intensities of the electromagnetic radiation E reflected from surfaces in the local environment L to generate, for example infrared image data. Typically, the sensor 250 is a digital device. In one embodiment in which the illuminator 270 is an infrared illuminator, the sensor 250 is a multispectral sensor, such as a combination red, green, blue, infrared (RGB-IR) sensor. In some embodiments, the multispectral sensor can include an array of complementary metal oxide semiconductor (CMOS) sensing elements or an array of charge-coupled device (CCD) sensing elements.

FIG. 2B illustrates at least a portion of an exemplary sensor array, which is referred to herein as a sensor array 251, that can be used in the sensor 250 of the camera device 200 of FIG. 2A, according to one embodiment. The sensor array 251 includes four different types of sensing elements 261-264. The four different types of sensing elements include (1) red-light sensing elements 261, (2) green-light sensing elements 262, (3) blue-light sensing elements 263, and (4) infrared sensing elements 264. The sensor array 251 is shown including a total of 64 sensing elements 261-264 including 8 red-light sensing elements 261, 32 green-light sensing elements 262, 8 blue-light sensing elements 263, and 16 infrared sensing elements 264. The sensor array 251 includes four times as many green-light sensing elements 262 compared to each of the red-light sensing elements 261 and blue-light sensing elements 263, and the sensor array 251 includes twice as many as many green-light sensing elements 262 compared to the infrared sensing elements 264, but other arrangements can also be used. For example, in some other embodiments a sensor array can be used in which there is an equal number of each of the sensing elements 261-264 or a sensor array can be used in which there is twice as many green-light sensing elements 262 compared to the other sensing elements 261, 263, 264.

Using the sensor array 251 allows for the resolution of the infrared images generated from the infrared sensing elements 264 of the sensor 250 to match the resolution of the visible images generated from the RGB sensing elements 261-263 of the sensor 250. This matching resolution allows for pixels in the visible image generated from the visible light sensing elements 261-263 to be replaced or adjusted based on corresponding pixels from the infrared image generated by the infrared sensing pixels 264. Replacing or adjusting pixels in the visible image based on pixels in the infrared image is discussed in further detail below.

Although the matching resolution between the visible image and the infrared image can simplify the process of adjusting the visible image based on the infrared image, it is also common for these resolutions to be different, such as a visible image with a greater resolution than the corresponding infrared image. In such embodiments, the lower resolution of the infrared image will typically cause the detected edge between the background region and the desired foreground region to be more granular (i.e., an edge determined from larger pixels causing a granular appearance to a user) than the image that is generated by the visible image that includes smaller pixels. In these cases, the more granular infrared image having less but larger pixels can be scaled to have more smaller pixels with a resolution matching the visible image using well-established image scaling methods like bilinear, bicubic, nearest neighbor, and mipmap image interpolation methods.

Using a multispectral sensor with a single sensor array, such as the sensor array 251, is one option for generating (1) a visible image and (2) a corresponding image from the reflected electromagnetic radiation after being directed from the illuminator 270. Other sensor arrangements are discussed below. Furthermore, although the visible light sensing elements 261-263 in the sensor array 251 are described as RGB-sensing elements, other arrangements of visible light sensing elements can also be used, such as an arrangements based on CYYM, RRYB, etc.

The sensor array 251 in FIG. 2B is shown to only include 8 rows and 8 columns of sensing elements 261-264 for ease of illustration, but it is to be understood that the actual sensor array 251 described herein includes many more sensing elements. For example, the sensor 250 may be selected to provide any available resolution, where the resolution is expressed as a horizontal resolution of about 720p, 1080p, 1440p, 3840p (4K), 7680p (8K), or more for a display device having an aspect ratio of about 4:3, 16:9, or 21:9. For example, if the sensor 250 is configured to provide a 3840p resolution for a display device having a 16:9 aspect ratio, then the sensor 250 is capable of providing 8,294,400 pixels per frame by using a sensor array that includes 3,840 horizontal rows of sensing elements 261-264.

Although the sensor array 251 shows an array of (1) red-light sensing elements 261, (2) green-light sensing elements 262, (3) blue-light sensing elements 263, and (4) infrared sensing elements 264, an intensity value for infrared energy can be determined for each sensing element 261-264 location on the sensor array 251. Similarly, an intensity value for each of the red light, green light, and blue light can be determined for every sensing element 261-264 location on the sensor array 251. Thus, in some embodiments an intensity value can be determined for each type of electromagnetic energy (e.g., red-light, green-light, blue-light, and IR) at each sensing element 261-264 location of the sensor array 251. Various well-known interpolation techniques (e.g., bilinear, bicubic) as well as techniques built-in to today's devices (e.g., a proprietary image processing technique built-in to a multispectral camera) can be used to perform a demosaicing process, so that an intensity value can be determined for each type of electromagnetic energy (e.g., red-light, green-light, blue-light, and IR) at each sensing element 261-264 location. After the demosaicing process, a visible image can be generated with input at each visible image pixel from each of the three sensing element colors (RGB), and an infrared image can be generated with the same resolution.

Because a visible image and an infrared image having matching resolutions can be created from the intensity values for each sensing element 261-264 location, the infrared intensity value (also referred to as an infrared pixel)—for each sensing element 261-264 location in the infrared image constructed from the demosaicing process—can then be used as a switch to control whether the corresponding pixel in the visible image generated by the measurements of the sensor 250 is modified (e.g., replaced or blurred) or not for the video conference. In the following disclosure, the use of infrared detection values as a switch is generally described as a mask (see FIG. 3B) generated from the infrared measurements that is used to control which pixels in the visible image will be designated as background or foreground, so that background modification or replacement can be performed on the pixels identified as belonging to the background.

Referring to FIG. 2A, one or both of the sensor 250 and the lens 204 can be movable with respect to one another to adjust the focal length of the camera device 200 using an autofocus (AF) system 206. The autofocus (AF) system 206 includes a lens driver 214 and one or more of a combination of a depth sensor 216, one or more AF sensors 218, and an AF processor 220. The AF system 206 may be configured as an active AF system, a passive AF system, or a hybrid thereof.

In some embodiments, the lens 204 may be selected for a desired blur or "bokeh" effect and/or to assist in facilitating the background differentiation methods described herein. For example, in some embodiments, the lens 204 may be of a type commonly used in portrait photography where an aperture of the lens 204 is selected to provide a relatively shallow depth of field so that the one or more conference participants stand out against a blurred background. In embodiments herein, the aperture of the lens 204 may be finely controlled, using the aperture adjustment mechanism 208, to allow for changes to the depth of field and to assist in facilitating the background differentiation methods described below. In other embodiments, the background can be blurred using software, for example software executed by the controller 212 of the camera device 200.

The aperture adjustment mechanism 208 can be used to change the aperture of the lens 204 by restricting the size of the opening having light passing therethrough, e.g., by use of a flexible diaphragm. In some embodiments, the AF system 206 may be used in combination with the aperture adjustment mechanism 208 to respectively focus on the desired portions of a scene and defocus or blur undesired portions of a scene.

The controller 212 is an electronic device that includes a processor 222, memory 224, support circuits 226, input/output devices 228, a video streaming device 230, and a communications device 232. The processor 222 may be any one or combination of a programmable central processing unit (CPU), a graphics processing unit (GPU), a digital signal processor (DSP), a programmable gate array (FPGA), an application-specific integrated circuit (ASIC), or other hardware implementation(s) suitable for performing the methods set forth herein, or portions thereof.

The memory 224, coupled to the processor 222, is non-transitory and represents any non-volatile type of memory of a size suitable for storing one or a combination of an operating system 234, one or more software applications, e.g., software application 236, background differentiation information 238 generated using the methods set forth herein, and one or more replacement backgrounds 240. The background differentiation information 238 can include, for example, information relating to which portions of an image are desired foreground and which portions are undesired background.

Examples of suitable memory that may be used as the memory 224 include readily available memory devices, such as random access memory (RAM), flash memory, a hard disk, or a combination of different hardware devices configured to store data. In some embodiments, the memory 224 includes memory devices external to the controller 212 and in communication therewith. In some embodiments, the software application 236 stored in memory 224 can include instructions which when executed by the processor 222 are configured to perform the portions of the methods described herein that are described as being performed by the camera device 200 or the alternative camera devices 201, 202 described below in reference to FIGS. 6A-7B.

The video streaming device 230 is coupled to the processor 222 and is generally used to encode video data acquired from the sensor 250 in a desired encoding format and at a desired bitrate. Generally, bitrate describes how much video data a video stream contains where higher resolution, higher frame rates, and lower compression each require an increased bitrate. Typically, the acquired video data is encoded into a desired encoding format, at a desired resolution, and at desired frame rate. The desired resolution may be about 720p, 1080p, 1440p, 3840p (4K), 7680p (8K), or more for a display device having an aspect ratio of about 4:3, 16:9, or 21:9. The desired frame rate is typically greater than about 30 frames per second (fps), and may be within in a range from about 30 fps to about 60 fps or more.

Here, the communications device 232, communicatively coupled to the video streaming device 230, delivers the encoded video data to the user device 110 using a wireless connection, such as WiFi or Bluetooth®, or a wired connection, such as the communication link 113 described above in reference to FIG. 1. As noted above, in some embodiments, the communication link 113 is a USB connector selected from the industry standards of USB 2.0, 3.0, and 3.1 having one or a combination of type A, B, C, mini-A, mini-B, micro-A, and micro-B plugs.

In some embodiments, the user device 110 then transmits the video data to a remote video conferencing endpoint, such as the second video conferencing endpoint 102, using the video conferencing software application 120. Typically, the desired encoding format, bit rates, and/or frame rates of the to-be-transmitted video data are established between the controller 212 and the video conferencing software application 120 of the user device 110 before full communication begins there between, e.g., by a handshake protocol. In other embodiments, video data is transmitted to a remote video conferencing endpoint(s) using conventional communication devices and protocols. For example, the video data may be transmitted to a remote video conferencing endpoint using a network interface card, Ethernet card, modem, wireless network hardware and/or other conventional computing device communication hardware.

Figure 3A:
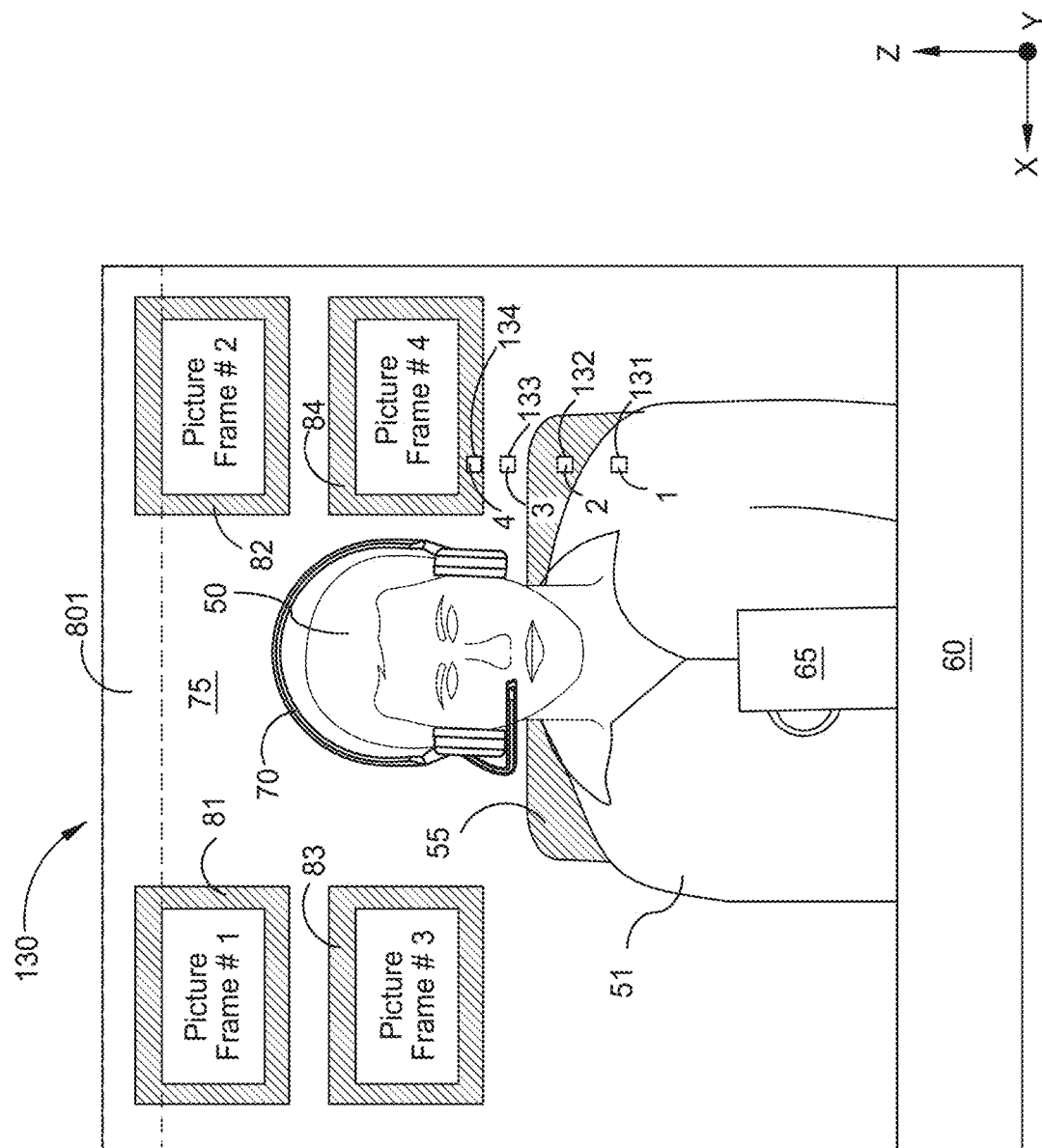
FIG. 3A is a visible image of an unmodified view (i.e., no background modification or replacement) of the local environment as viewed by the camera device, according to one embodiment.
Figure 3B:
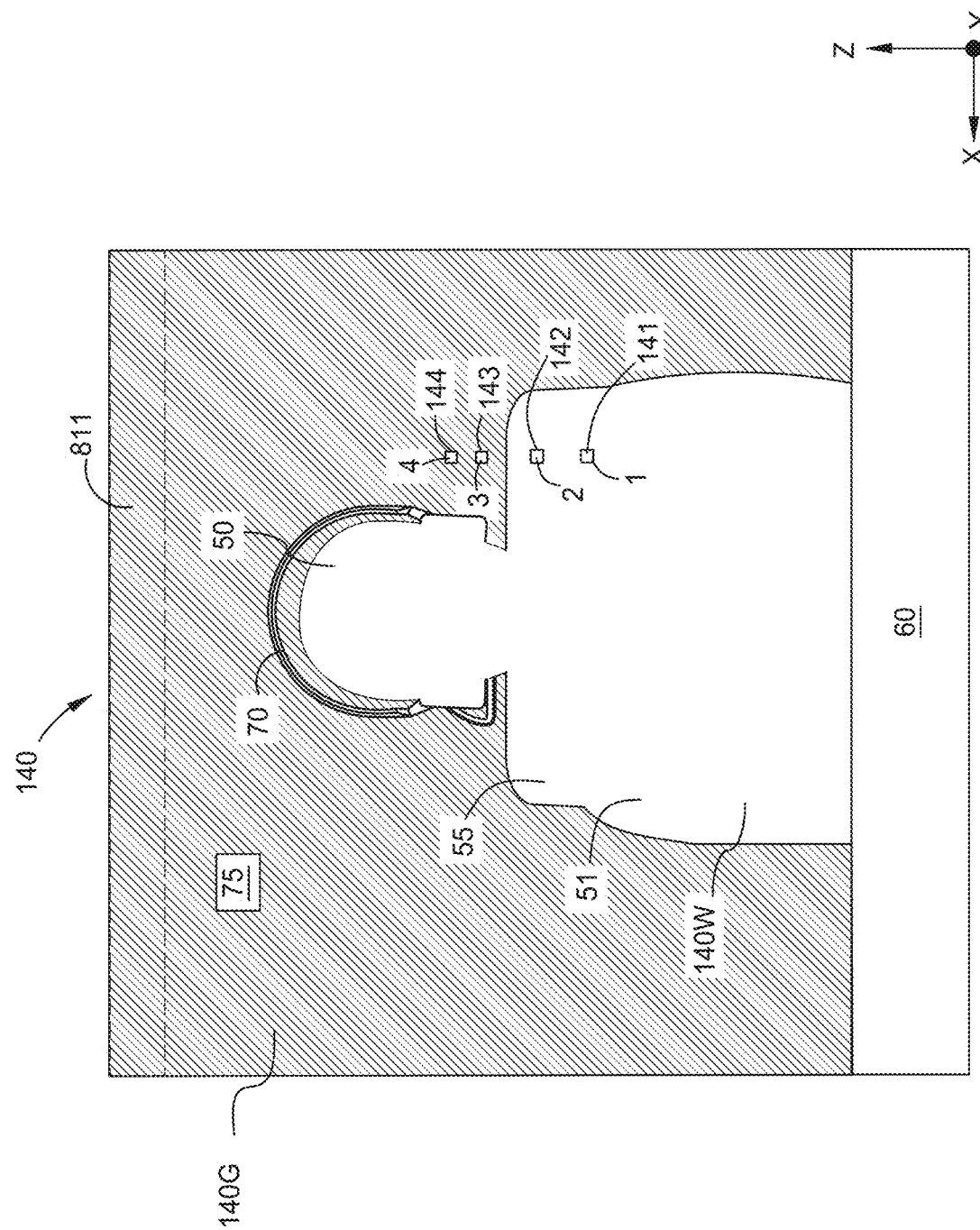
FIG. 3B is an infrared image of the local environment from the same view shown in FIG. 3A, according to one embodiment.
Figure 4:
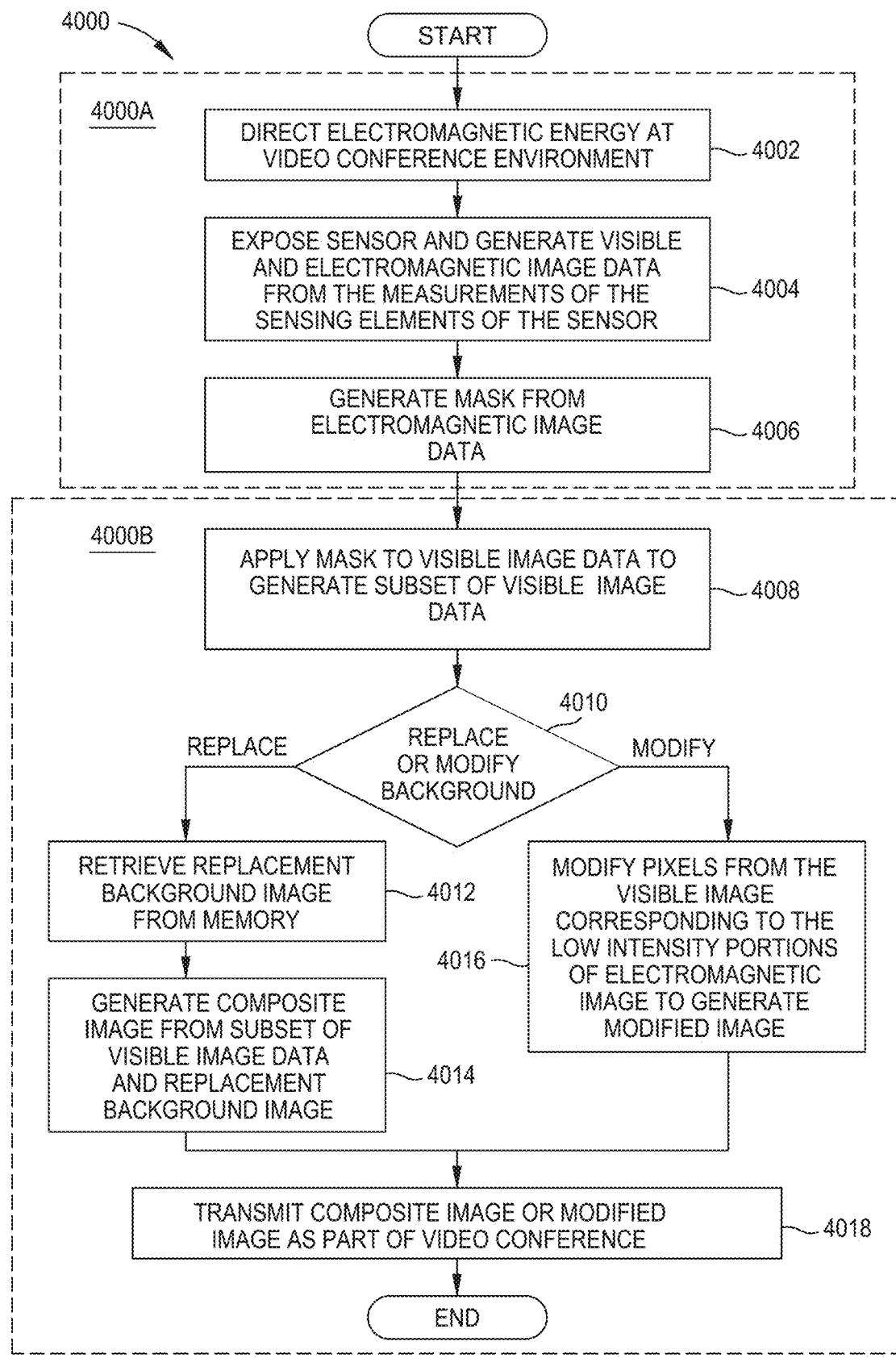
FIG. 4 is a process flow diagram of a method for generating and transmitting a visible image for a video conference without an undesired background using the camera device of FIGS. 1, 2A, and 2B, according to one embodiment.

FIGS. 3A and 3B illustrate some exemplary visible and infrared images captured by the camera device 200 according to one or more of the embodiments of the disclosure provided herein. FIG. 4 illustrates a method for transmitting images captured by the camera device 200 without an undesired background according to one or more of the embodiments of the disclosure provided herein.

FIG. 3A is a visible image 130 of an unmodified view (i.e., no background modification or replacement) of the local environment L as captured by the camera device 200. In FIG. 3A, the user 50 is in the same position as FIG. 1 except that the user 50 has put on a headset 70 and has placed the cup 65 on the desk 60. The unmodified view in FIG. 3A also includes a portion of the back wall 75 that includes four picture frames 81-84 hanging on the back wall 75. The first and third picture frames 81, 83 are also shown in the side view of FIG. 1.

The visible image 130 is formed of pixels. Four exemplary pixels 131-134 are shown. These four pixels 131-134 include (1) a first pixel 131 showing a portion 1 of the user's shirt 51, (2) a second pixel 132 showing a portion 2 of the chair 55, (3) a third pixel 133 showing a portion 3 of the back wall 75, and (4) a fourth pixel 134 showing a portion 4 of the fourth picture frame 84. For ease of illustration, larger than normal pixels are shown than would be used in an actual image. The locations of these portions 1-4 in the Y-direction and Z-direction are also shown in FIG. 1.

With reference to FIGS. 1 and 3A, additional detail on the video conferencing system 100 is described. The first video conferencing endpoint 101 includes the camera device 200. The camera device 200 includes the sensor 250 and the illuminator 270. The sensor 250 is configured to (1) receive visible light for generating visible images for the video conference, and (2) detect intensities of the electromagnetic radiation E reflected from surfaces in the local environment L to generate, for example infrared images.

Referring to FIG. 1, the illuminator 270 directs the electromagnetic radiation E (e.g., infrared radiation) at a foreground portion F and a background portion B of the local environment L. The foreground portion F can include the user 50 and objects close to or in front of the user 50, such as the chair 55, the desk 60, and the cup 65. The background portion B can include portions of the local environment L in view of the camera device 200 and located at least a given distance behind the user (e.g., >12 inches, 24 inches, 36 inches etc.), such as the back wall 75 and the picture frames 81-84.

The electromagnetic radiation E directed from the illuminator 270 then reflects off of surfaces in the foreground portion F and the background portion B. The reflected electromagnetic radiation E is then received by the sensor 250. The sensor 250 can detect the intensity of the reflected electromagnetic radiation E across the foreground portion F and the background portion B of the local environment L that are in view of the camera device 200. For example, the intensity of the reflected electromagnetic radiation E can be detected across the local environment L using the infrared sensing elements 264 in the sensor array 251 described above in reference to FIGS. 2A and 2B. The detection from each infrared sensing element 264 can be used to generate the pixels in an infrared image.

The surfaces in the foreground portion F are located substantially closer to the camera device 200 (i.e., closer to the illuminator 270 and the sensor 250) than the surfaces in the background portion B. The relevant distances here that effect the decay of the electromagnetic radiation E are (1) the distance between the surface in the local environment L (e.g., portion 1) and the illuminator 270, and (2) the distance between the surface in the local environment L (e.g., portion 1) and the sensor 250, but because the distance between the illuminator 270 and the sensor 250 is a minimal distance inside the camera device 200 in this example, the distance discussed below is shortened to the distance between the surface in the local environment L (e.g., portion 1) and the camera device 200. FIG. 3A shows that the portions 1-4 are each located at a same location in the X-direction. Furthermore, FIG. 3A also shows that the vertical position of each of the portions 1-4 in the vertical Z-direction only vary from each other by a small amount, such as less than about 12 inches between the lowest portion 1 and the highest portion 4. Thus, most of the difference between the distances of each of the portions 1-4 and the camera device 200 is in the Y-direction as shown in FIG. 1.

Referring to FIG. 1, the portion 1 of a user's shirt 51 is located a first distance D1 from the camera device 200. The portion 2 of the chair 55 is located a second distance D2 from the camera device 200. The portion 3 of the back wall 75 is located a third distance D3 from the camera device 200. The first distance D1 and the second distance D2 are each substantially less than the third distance D3. For example, the third distance D3 is at least twice as far as each of the first distance D1 and the second distance D2. Furthermore, the second distance D2 is relatively close to the first distance D1 with the difference between the first distance D1 and the second distance D2 being about 12 inches plus or minus a few inches, for example.

The view of the fourth picture frame 84 is blocked by the third picture frame 83 in the side view of FIG. 1. Although the fourth picture frame 84 is not shown in FIG. 1, the location of the portion 4 of the fourth picture frame 84 in the Y-direction and the Z-direction is shown in FIG. 1. Furthermore, although the distance between the camera device 200 and the portion 4 of the fourth picture frame 84 is not separately shown in FIG. 1A, this distance is within a few inches of the third distance D3. Thus, the portion 4 is also located at a substantially greater distance from the camera device 200 (e.g., twice as far) relative to each of the distances D1, D2 for the respective portions 1, 2. This difference in distances from the camera device 200 to portions in the foreground F (e.g., portions 1, 2) compared to the substantially further away portions in the background B (e.g., portions 3, 4) allows for the foreground F to be separated from the background B because substantially less reflected electromagnetic radiation E is received at the sensor 250 from the further away portions in the background B compared to the substantially closer portions in the foreground F.

The intensity of electromagnetic radiation, such as infrared radiation, decays with distance. More specifically, the decay of intensity of electromagnetic radiation is proportional to the square of the distance from the source of the electromagnetic radiation (e.g., the illuminator 270). Additionally, with reference to the well-known equation using Plank's constant (E=hv), where E is energy, h is Plank's constant, and v is frequency of the radiation, it is known that radiation with a lower frequency (v), and thus a longer wavelength, carry less energy (E) than radiation with a higher frequency and shorter wavelength. Thus, forms of electromagnetic energy with longer wavelengths tend to decay at a greater rate over distances compared to electromagnetic energy with shorter wavelengths. For example, because infrared wavelengths have a longer wavelength than the wavelengths within the visible range, the intensity of the generated infrared electromagnetic radiation decays more over a given distance than electromagnetic radiation within the visible range. Moreover, certain wavelengths are also preferentially absorbed by the medium through which they pass, such as in the video conferencing case where the medium is air and infrared is preferentially absorbed by one or more components within the air when compared to visible light.

The rate at which the intensity of the infrared wavelengths decay is suitable for the distances often encountered during video conferences. These distances can include (1) the distance between the camera device and the user(s) and other objects in the foreground, (2) the distance between the camera device and the background, and (3) the distance between the foreground and the background. The distance between the camera device and the background is the greatest of these three distances and this distance can range from about a few feet to about fifty feet, such as from about three feet to about fifteen feet, such as about five feet.

The illuminator 270 and the sensor 250 of the camera device can be configured, so that there is a meaningful decay across distances within these ranges. This meaningful decay can assist the sensor 250 in distinguishing between the foreground and background. Although generally not required, in some embodiments the intensity and/or wavelength of the energy directed by the illuminator 270 can be adjusted to provide for a more substantial decay across the distances of a particular video conference environment. Using well-establish techniques for auto focus or low cost depth sensors, the depth of objects and user(s) in the foreground can be estimated, and the infrared intensity from the illuminator can be adjusted to increase the difference in infrared intensity measurements at the sensor between the foreground and background elements in a given environment. For example, when the user(s) and other objects in the foreground are determined to be further away from the camera device 200 relative to a standard distance (e.g., 5 feet), then the intensity of the infrared energy can be increased relative to the intensity used for the standard distance. Conversely, when the when the user(s) and other objects in the foreground are determined to be closer to the camera device 200 relative to a standard distance (e.g., 5 feet), then the intensity of the infrared energy can be decreased relative to the intensity used for the standard distance. Similarly, longer wavelengths can be used for a faster decay when the when the user(s) and other objects in the foreground are determined to be closer to the camera device 200 relative to a standard distance (e.g., 5 feet), and shorter wavelengths can be used for a slower decay when the when the user(s) and other objects in the foreground are determined to be further from the camera device 200 relative to a standard distance (e.g., 5 feet).

The decay of electromagnetic radiation described above causes the electromagnetic radiation E reflected from the surfaces in the foreground portion F to have a higher intensity when received by the sensor 250 than the intensity of the electromagnetic radiation E reflected from the surfaces in the background portion B. This intensity difference can be seen in an infrared image, such as the image shown in FIG. 3B.

FIG. 3B is an infrared image 140 of the local environment L from the same view shown in FIG. 3A, according to one embodiment. The infrared image 140 is generated from the infrared intensity detections acquired by the infrared sensing elements 264 in the sensor array 251 of the sensor 250 shown in FIG. 2B. Although the infrared sensing elements 264 can generate a continuous or near continuous range of intensity detections, the infrared image 140 of FIG. 3B only shows portions of the local environment L as either white areas 140W (also referred to as white pixels 140W) or hatched areas 140H (also referred to as hatched pixels 140H). Parsing the image 140 into two groups of pixels 140W, 140H allows the two groups of pixels 140W, 140H to be used as a switch, so the background modification and replacement methods disclosed herein can be performed. The infrared image 140 can be formed in parallel with the visible image formed by the sensing elements 261-263 in the sensor array 251 of the sensor 250 by parsing the data collected by the various sensing elements 261-264 of the sensor 250, or be sequentially formed as periodic interleaved frames within the video stream that includes frames of the visible image formed by the sensing elements 261-263 by poling or scanning the different types of sensing elements 261-263 and 264 periodically in time.

The white areas 140W correspond to areas of the local environment L from which the sensor 250 receives infrared radiation at an intensity above a specified intensity threshold value. The hatched areas 140H correspond to areas of the local environment L from which the sensor 250 receives infrared radiation at an intensity that is not above the specified intensity threshold value. As described above, this infrared radiation received at the sensor 250, which is used to form the infrared image 140, is primarily (e.g., >90%) infrared radiation that is initially directed from the illuminator 270 and then reflected from surfaces in the local environment L to the sensor 250.

The intensity for each pixel 140W, 140H can generally correspond to measurements (e.g., weighted average measurements) performed by infrared sensing elements 264 on locations of the sensor array 251 that are nearby the corresponding location of the pixel in the infrared image. As described above, an infrared intensity value is determined for each sensing element 261-264 location using algorithms, such as well-known interpolation techniques, so that the infrared image has more pixels (e.g., four times as many) than the number of infrared sensing elements 264 in the sensor array 251. Generally, the intensity measured by each infrared sensing element 264 corresponds to a charge that accumulates on the infrared sensing element 264 during an exposure time period of the infrared sensing elements 264 (e.g., scan rate of pixels within the sensing element). This charge for each infrared sensing element 264 is then converted to a digital infrared intensity value. These digital infrared intensity values can then be used with digital infrared intensity values from surrounding infrared sensing elements 264 (e.g., all the infrared intensity values in a 5×5 square or a 15×15 square on the sensor array 251) in the algorithms mentioned above (e.g., interpolation techniques) to generate the infrared intensity value for each sensing element 261-264 location of the sensor array 251. Having the infrared intensity value for each sensing element 261-264 location on the sensor array 251 creates an infrared intensity value for each pixel in the infrared image.

Because the pixels in the infrared image correspond to the pixels in the visible image generated from the sensor array 251, the pixels in the infrared image can be used as a switch to control whether the pixels in the visible image are to be considered part of the foreground or background. For example, the intensity value for each sensing element 261-264 location can be compared to an intensity threshold value (i.e., also a digital value) stored in memory to determine whether the pixel corresponds to a high-intensity area (i.e., white pixels 140W) or a low-intensity area (i.e., hatched pixels 140H). This intensity threshold value can be adjusted manually by a user to provide the desired separation of the foreground and background with the generation of the white pixels 140W and the hatched pixels 140H. The user can also adjust one or more of the intensity of the energy emitted by the illuminator 270 and the exposure time that the infrared sensing elements are exposed for each measurement, so that the desired separation of the foreground and background is achieved by the generation of the white pixels 140W and the hatched pixels 140H. In some embodiments, the camera device 200 can automatically make adjustments to one or more of the intensity of the energy emitted by the illuminator 270, the intensity threshold value, and the exposure time that the infrared sensing elements 264 are exposed for each measurement, so that the desired separation of the foreground and background can be achieved by the generation of the white pixels 140W and the hatched pixels 140H.

These adjustments of intensity threshold value, intensity emitted by the illuminator 270, and exposure time initiated by the user or the camera device 200 can also be useful when ambient levels of infrared energy change. For example, increases in ambient levels of infrared energy at wavelengths around the wavelength(s) emitted by the illuminator 270 can cause more infrared sensing elements 264 to output measurements that are above the specified intensity threshold, which can cause portions of the background to be incorrectly determined as foreground portions unless an adjustment to one or more of the intensity threshold value, intensity emitted by the illuminator 270, and exposure time is made.

The white areas 140W for which infrared radiation is received at the sensor 250 at intensities above the infrared intensity threshold value are designated as the desired foreground for the video conference while the hatched areas 140H for which infrared radiation is received at the sensor 250 at intensities that are not above the infrared intensity threshold value are designated as the undesired background for the video conference. In some embodiments, the intensity threshold value for determining what portion of the video conference environment to include in the foreground, such as the user(s), can also be adjusted to account for varying distances between the user(s) and the camera device 200 as well as how close the background is to the user(s). Furthermore, in some embodiments, the intensity and/or the wavelength of the electromagnetic energy emitted from the illuminator 270 can be adjusted to account for changes in the distance between the user(s) and the camera device 200 as well as how close the background is to the user(s).

Furthermore, the infrared image 140 from FIG. 3B can have the same resolution as the visible image 130 from FIG. 3A. Therefore, each pixel in FIG. 3B can have a corresponding pixel in FIG. 3A allowing for adjustments to be made to the visible image 130 of FIG. 3A on a pixel by pixel basis based on differences between the pixels in the infrared image 140 of FIG. 3B. As shown, the infrared image 140 includes (1) a first infrared pixel 141 for the portion 1 of the user's shirt 51, (2) a second infrared pixel 142 for the portion 2 of the chair 55, (3) a third infrared pixel 143 for the portion 3 of the back wall 75, and (4) a fourth infrared pixel 144 for the portion 4 of the fourth picture frame 84. Because the resolution of the infrared image 140 matches the resolution of the visible image 130 and because the images 130, 140 are generated from a single sensor array 251 of the sensor 250 as described above in reference to FIGS. 2A and 2B, the infrared pixels 141-144 of the infrared image 140 of FIG. 3B correspond respectively to the pixels 131-134 of the visible image 130 of FIG. 3A. Thus, for example, the first visible pixel 131 and the first infrared pixel 141 are both pixels showing the exact same portion 1 of the user's shirt 51.

As mentioned above, the distance between a surface in the local environment L to the camera device 200 has a large effect on whether infrared radiation reflected from that surface to the sensor 250 is above the infrared intensity threshold value being used to distinguish between foreground and background surfaces. As shown in FIGS. 1 and 3A, most of the difference in distance between the camera device 200 and the exemplary portions 1-4 of the local environment L is in the Y-direction. As mentioned above, the first distance D1 from the portion 1 of the user's shirt 51 to the camera device 200 and the second distance D2 from the portion 2 of the chair 55 to the camera device 200 are relatively close to each other, such as within about 12 inches. Due to closeness of these distances D1, D2 to each other, the intensity of the infrared radiation E received at the sensor 250 for these two portions 1, 2 is substantially similar. Furthermore, due to the short length of these distances D1, D2 to the camera device 200, the intensities of the infrared radiation E reflected from these portions 1, 2 when received by the sensor 250 are above the specified intensity threshold value for this example. Therefore, the corresponding infrared pixels 141, 142 (FIG. 3B) for these portions 1, 2 are both shown as white (i.e., intensity above the threshold value) in the white areas 140W of the infrared image 140.

On the other hand, the distance D3 from the portion 3 of the back wall 75 is substantially further from the camera device 200 relative to first and second distances D1, D2. Due to this further distance, the intensity of the infrared radiation reflected from the portion 3 of the back wall 75 is substantially below the intensity threshold value for this example. The portion 4 of the fourth picture frame 84 is located within a few inches of the portion 3 of the back wall 75, and thus the distance between the portion 4 of the fourth picture frame 84 to the camera device 200 is within a few inches of D3. Therefore, the intensity of the infrared radiation reflected from the portion 4 is also substantially below the intensity threshold value for this example. Due to the lower intensities as received by the sensor 250 of infrared radiation reflected from the portions 3, 4, the corresponding pixels 143, 144 for these portions 3, 4 are both shown as hatched in the hatched areas 140H of the infrared image 140 of FIG. 3B. Next a method is described for using an image, such as the infrared image 140 of FIG. 3B, to separate an undesired background from a visible image, such as the visible image 130 of FIG. 3A.

FIG. 4 is a process flow diagram of a method 4000 for generating and transmitting a visible image for a video conference without an undesired background using the camera device 200 of FIGS. 1 and 2A, according to one embodiment. Transmitting the visible image without the undesired background can include transmitting the visible image with a modified version of the background captured by the camera device 200 or transmitting the visible image with a replacement background that replaces the background captured by the camera device 200. In addition to FIG. 4, the method 4000 is described in reference to FIGS. 1-3B as well as FIGS. 5A-5D, which are introduced as the method 4000 is described. The method 4000 is described as being executed on the visible image 130 of FIG. 3A.

The method 4000 is described as being executed in a data acquisition portion 4000A and an image processing portion 4000B. In the data acquisition portion 4000A visible image data and infrared image data are generated based on sensor detections, and a mask is generated from the infrared image data. In the image processing portion 4000B, the mask generated in the data acquisition portion 4000A is applied to modify the visible image data (e.g., background replacement) acquired in the data acquisition portion 4000A, and a modified image is transmitted as part of the video conference.

Block 4002 begins the data acquisition portion 4000A. At block 4002, the illuminator 270 of the camera device 200 illuminates the local environment L with the electromagnetic radiation (i.e., radiation within the second range of wavelengths) at the one or more emitted wavelengths provided from the illuminator 270, which, while not intending to be limiting to the disclosure provided herein, for simplicity of discussion is also sometimes referred to herein as the infrared radiation E illustrated in FIG. 1. The illuminator 270 can illuminate the local environment L in response to instructions received from the controller 212 of the camera device 200. The instructions from the controller 212 to the illuminator 270 can be sent from the controller 212 to the illuminator 270 as part of the execution of the software application 236 in the memory 224 of the camera device 200. In some embodiments, the execution of the software application 236 can begin in response to user input on the user device 110 with the user device 110 notifying the camera device 200 to start the software application 236.

At block 4004, the sensor 250 is exposed to receive visible light (i.e., radiation within the first range of wavelengths) and the electromagnetic radiation E (i.e., radiation within the second range of wavelengths) as shown in FIG. 1. The electromagnetic radiation E received by the sensor 250 at block 4004 is primarily electromagnetic radiation E reflected from surfaces in the local environment L after the electromagnetic radiation E was directed by the illuminator 270 at the local environment L at block 4002. Visible image data and infrared image data are generated from the detections of the respective RGB and IR sensing elements 261-264 (see FIG. 2B) of the sensor 250. As discussed above in reference to FIGS. 2B and 3B, visible image data and infrared image data can be generated for each sensing element 261-264 location, so that there are four values (i.e., intensities for RGB and IR) for each sensing element 261-264 enabling an infrared intensity value to control each corresponding pixel in the visible image. The visible and infrared image data can be sent to the controller 212 from the sensor 250 for additional processing as discussed below.

The visible image data generated from detections of the RGB sensing elements 261-263 at block 4004 can be generated in a format that can subsequently be used to generate a visible image, such as a visible image formed of pixels. Here, the visible image data captured by the RGB sensing elements 261-263 corresponds to the visible image 130 from FIG. 3A. In the discussion below, because the visible image data generated at block 4004 corresponds to the visible image 130, the visible image data generated at block 4004 is also referred to as the visible image 130. The infrared image data generated from the detections of the infrared sensing elements 264 can similarly be generated in a format that can subsequently be used to generate an infrared image, such as an infrared image formed of pixels. In this description, an image of the raw infrared detections is not shown, and instead the infrared image data is sorted into two groups as discussed in the next block 4006.

At block 4006, a mask is generated based on the infrared image data generated at block 4004. After receiving the infrared image data from the sensor 250 at block 4004, the controller 212 can generate the mask from the infrared image data as part of executing the software application 236. The mask generated here separates the infrared image data into a first group of high-intensity detections (see white pixels 140W of the foreground from FIG. 3B) above a specified infrared intensity threshold value and into a second group of low-intensity detections (see hatched pixels 140H of the background from FIG. 3B) that are not above the specified infrared intensity threshold value. Thus, the generating the mask identifies a first portion (i.e., the foreground) of the local environment L based on the infrared intensity detections from the first portion being above the specified intensity threshold value, and generating the mask also identifies a second portion (i.e., the background) of the local environment L based on the infrared intensity detections from the second portion not being above the specified intensity threshold value. Generating the mask can be described as identifying a first portion of the local environment L and a second portion of the local environment L based on a comparison of the detected intensity of the electromagnetic radiation in the second range of wavelengths to an intensity threshold value. More generally, generating the mask can be described as identifying a first portion of the local environment L (e.g., the foreground) based on values relating to the detected intensity of the electromagnetic radiation received in the second range of wavelengths, and identifying a second portion of the local environment L (e.g., the background) based on values relating to the detected intensity of the electromagnetic radiation received in the second range of wavelengths.

As described below, the mask is applied to control which pixels in the visible image 130 of FIG. 3A generated at block 4004 will be included without modification in the visible image that will be transmitted as part of the video conference. A visible representation of the mask generated at block 4006 is shown in the infrared image 140 of FIG. 3B where each pixel in the infrared image 140 is either a high-intensity white pixel 140W or a low-intensity hatched pixel 140H.

From a data standpoint, the mask generated here can be a single bit for each pixel location, such as a "one" for the location of each high-intensity white pixel 140W and a "zero" for the location of each low-intensity hatched pixel 140H. As discussed below in block 4008, the location of the "ones" in the mask function to "mask on" the pixels from the visible image 130 corresponding to the white pixels 140W of the infrared image 140. Conversely, the location of the "zeroes" in the mask function to "mask off" the pixels from the visible image 130 corresponding to the hatched pixels 140H (i.e., the pixels showing the undesired background) of the infrared image 140. The completion of block 4006 is the end of the data acquisition portion 4000A.

In some embodiments, separating the foreground portion F from the background portion B includes using an edge detection method to detect the peripheral edges of objects in the foreground portion F, and thus define the boundaries between the foreground portion F and the background portion B. Typically, an edge is defined as a boundary between two regions having distinct hatched level properties, i.e., pixels where the brightness or intensity thereof changes abruptly across the boundary region. Edge detection algorithms may be used to locate these abrupt changes in the detected pixel intensity within the infrared image 140. For example, at least portions of block 4006 are performed using one or more edge detection algorithms, e.g., by use of a binary map or a Laplacian operator. In some embodiments, at least portions of block 4006 are performed using one or more edge detection algorithms to determine the edges between the foreground portion F and the background portion B of the local environment L and/or to filter the background portion B from the local environment L. For example, in some embodiments the edge detection algorithm uses a binary mask (morphological image processing), a differentiation operator, such as the Prewitt, Sobel, or Kayyali operators, or a transform, such as a discrete Fourier transform, or a Laplacian transform. The one or more edge detection algorithms may be stored in the memory of the camera device 200 as a software application 236.

Block 4008 begins the image processing portion 4000B. At block 4008, the mask generated at block 4006 is applied to the visible image data (i.e., visible image 130) generated at block 4004 to generate a first subset of visible image data. The controller 212 can apply the mask to the visible image data as part of the execution of the software application 236. The first subset of visible image data generated at block 4008 corresponds to the pixels of visible image 130 to include without any modification in an image for the video conference (i.e., the pixels of the desired foreground). Because application of the mask results in masking-on the pixels in visible image 130 corresponding to the white pixels 140W in infrared image 140 as discussed above, applying the mask results in generating a first subset of visible image data corresponding to the image shown in FIG. 5A. The remainder of visible image data can also be referred to as a second subset of the visible image data (i.e., the visible image data that is "masked-off"). This second subset of visible image data corresponds to the background of the local environment L. The second subset of visible image data can be used to modify the image of the background of the local environment L as discussed below in reference to block 4016.

The process described above of masking on the white pixels 140W and masking off the hatched pixels 140H is one process for controlling which pixels from the visible image are to be included in the video conference without any modification. In other embodiments, the white pixels 140W can be masked off and the hatched pixels 140H can be masked on, and the corresponding logic can be reversed to arrive at the same result so that the visible pixels corresponding to the white pixels 140W end up in the video conference without any modification and the visible pixels corresponding to the hatched pixels 140H are replaced or modified for the video conference. Furthermore, in some embodiments, it may simply be sufficient to use the infrared image data to identify only the low-intensity areas (i.e., the hatched pixels 140H) or only the high-intensity areas (i.e., the white pixels 140W) and then the visible image can be modified based on this single identification.

FIG. 5A is a modified visible image 130A of the local environment L, according to one embodiment. The modified visible image 130A of FIG. 5A is the same as the visible image 130 of FIG. 3A except that the visible pixels corresponding to the hatched pixels 140H from FIG. 3B have been removed through application of the mask at block 4008. The removed pixels correspond to the second subset of visible image data discussed above. As shown in FIG. 5A, applying the mask at block 4008 has resulted in selecting the pixels corresponding to the surfaces of the user 50 and other objects (e.g., chair 55, desk 60, etc.) in the foreground F (see FIG. 1) while the pixels corresponding to the objects (e.g., back wall 75) in the background B (see FIG. 1) have been removed as illustrated by the repeating X-pattern in FIG. 5A. Thus, the visible pixels, such as pixels 131, 132 corresponding to respective portions 1, 2 of the user's shirt 51 and the chair 55 that reflect the electromagnetic radiation at the emitted wavelengths provided from the illuminator 270 to the sensor 250 at intensities above the specified intensity threshold value are selected for inclusion in visible image 130A of FIG. 5A.

On the other hand with reference to FIG. 3A, visible pixels, such as pixels 133, 134 corresponding to respective portions 3, 4 of the back wall 75 and the fourth picture frame 84 that reflect electromagnetic radiation to the sensor 250 at intensities that are not above the specified intensity threshold value have been removed in the visible image 130A of FIG. 5A. As discussed above, the greater distance between the camera device 200 and the portions 3, 4 in the background relative to the distance between the camera device 200 and the portions 1, 2 causes the intensity of the electromagnetic radiation within the emitted wavelengths from the illuminator 270 reflected from the portions 3, 4 in the background to decay to a level below the specified intensity threshold value when this reflected electromagnetic radiation is received by the sensor 250.

In the method 4000, only one electromagnetic radiation intensity threshold value is used (e.g., one infrared intensity threshold value). Thus, all electromagnetic radiation intensity detections fall into one of two groups with one being greater than the threshold value, and the second being less than or equal to this one electromagnetic radiation intensity threshold value. In this method 4000, the use of single intensity threshold value is used to place each of the detections into one of the two groups of the foreground or the background with the first subset of visible image data corresponding to the foreground and the second subset of visible image data corresponding to the background. In other embodiments, two or more intensity threshold values could be used. For example, if two intensity threshold values were used, portions of the video conference environment with intensities greater than the higher threshold value could be designated as a foreground while portions of the video conference environment with intensities between the higher and lower threshold value could be designated as a middle ground, and portions of the video conference environment with intensities below the lower threshold value could be designated as the background. The corresponding portions of the visible images could then be modified based on these designations, such as not modifying the foreground, blurring the middle ground, and replacing the background. Furthermore, in some embodiments the intensity threshold value(s) could be used in different ways. For example, in one embodiment using a single intensity threshold value that separates the foreground from the background, the camera device could alternatively modify or replace the foreground while leaving the background unmodified.

At block 4010, the controller 212 determines whether background replacement or background modification has been selected, for example as part of the execution of software application 236. This selection can be made by the user, for example by interacting with the user device 110, which is in communication with the camera device 200 or by the user directly interacting with the camera device 200. If background replacement is selected, then the method 4000 proceeds to block 4012. If background modification is selected, then the method 4000 proceeds to block 4016.

Figure 5B:
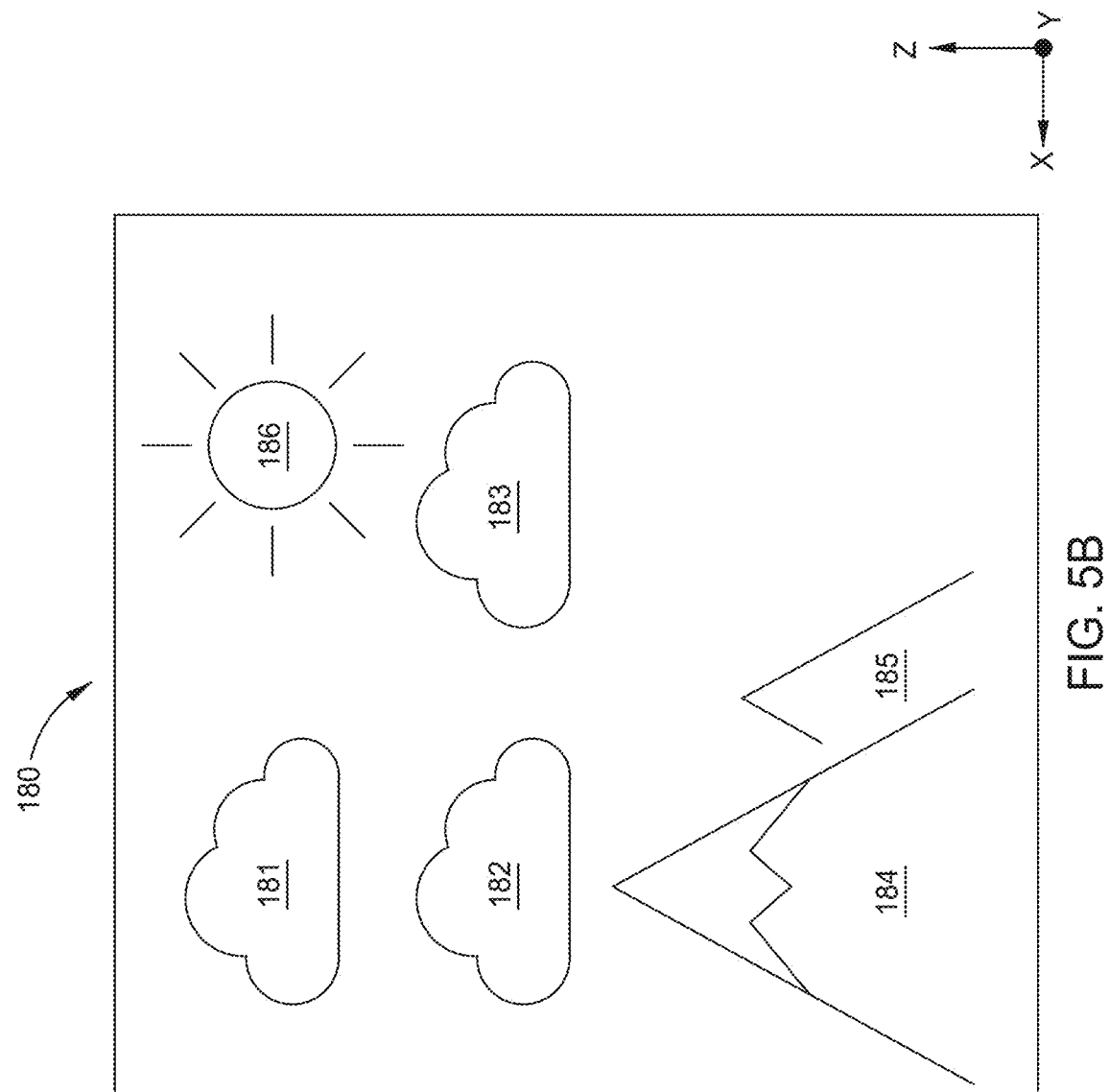
FIG. 5B is an exemplary replacement background image, according to one embodiment.

At block 4012, when background replacement is selected, a replacement background image is retrieved from memory 224. The controller 212 can retrieve the replacement background image from the replacement backgrounds 240 of the memory 224 as part of the execution of the software application 236. FIG. 5B is an exemplary replacement background image 180, according to one embodiment. The exemplary replacement background image 180 includes three clouds 181-183, two mountains 184, 185, and a sun 186. The replacement background image 180 can have a same resolution as the original visible image 130 from FIG.

3A, so that each pixel from the visible image data generated at block 4008 can replace a corresponding pixel from the replacement background image. Or stated another way, each empty pixel location not filled by the first subset of visible image data generated at block 4008 can be filled by a pixel from the corresponding location in the replacement background image 180.

Figure 5C:
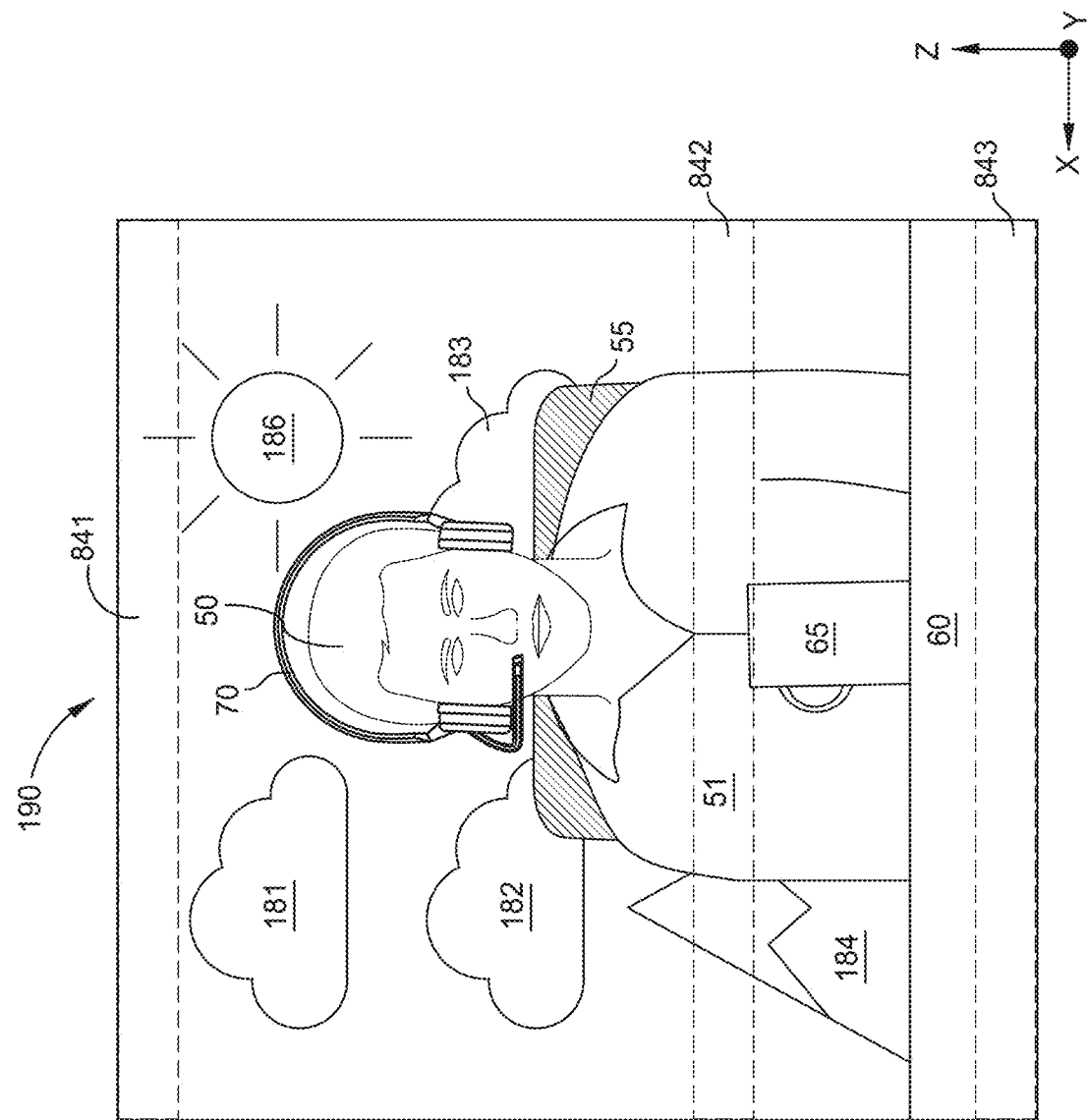
FIG. 5C is an exemplary composite image, according to one embodiment.

At block 4014, a composite image 190 shown in FIG. 5C is generated from (1) the first subset of visible image data generated at block 4008 by application of the mask (i.e., the image 130A of FIG. 5A) and (2) the replacement background image 180 retrieved at block 4012. The controller 212 can generate the composite image 190 as part of the execution of the software application 236. As part of the software replacement process the resolution or amount of information provided in the replacement background can be reduced to reduce the amount of image data that needs to be transmitted from the camera device 200 in subsequent operations.

FIG. 5C is an exemplary composite image 190, according to one embodiment. Because the original visible image 130 has the same resolution as the replacement background image 180, the controller 212 can generate the composite image 190 by replacing each pixel in the replacement background image 180 with the pixels included in the modified image 130A of FIG. 5A.

On the other hand, when background modification is selected instead of background replacement, the method 4000 proceeds from block 4010 to block 4016. At block 4016, a modified visible image 130B is generated as shown in FIG. 5D.

Figure 5D:
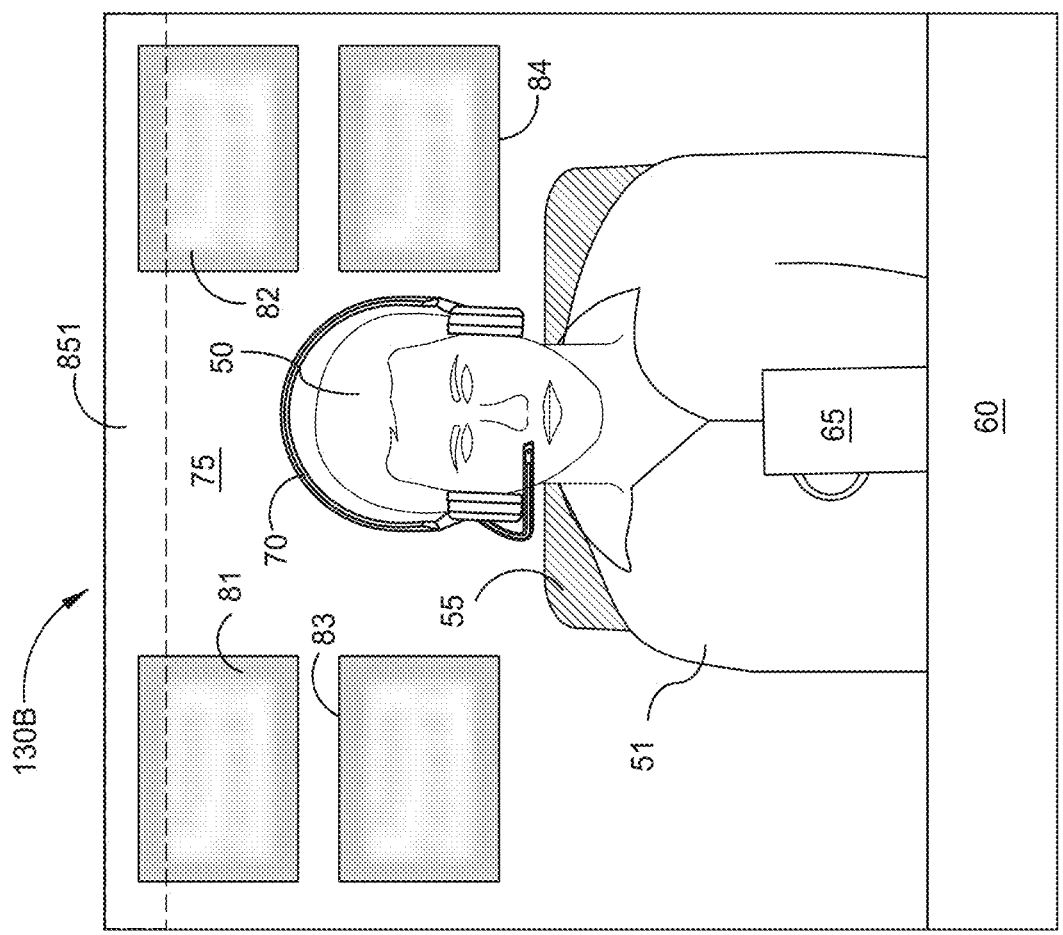
FIG. 5D is an exemplary modified image of the local environment L that can be generated by modifying the visible image of FIG. 3A, according to one embodiment.

FIG. 5D is an exemplary modified image 130B of the local environment L that can be generated by execution of block 4016 on the visible image 130 of FIG. 3A (i.e., the visible image originally captured by the camera device 200), according to one embodiment. The modified visible image 130B of FIG. 5D is the same as the visible image 130 of FIG. 3A except that the visible pixels corresponding to the hatched pixels 140H from FIG. 3B have been modified. On the other hand, the visible pixels (see FIG. 5A) corresponding to the white pixels 140W from the infrared image 140 of FIG. 3B have not been modified. Application of the mask at block 4008 generated the first subset of visible image data corresponding to the foreground. Thus, the remainder of visible image data not in the first subset of visible image data corresponds to the background. As discussed above this remainder of the visible image data not included in the first subset of visible image data can be designated as being part of a second subset of visible image data.

In the modified image 130B of FIG. 5D, the background has been blurred. Blurring is one example of background modification that can be performed on a background of an image, and other background modifications can be performed, such as darkening the background. The modified image 130B can be generated at block 4016 by the controller 212 performing a software blurring process that modifies the second subset of visible image data as part of the execution of the software application 236. In one embodiment, as part of the software blurring process the resolution of the background can be reduced to create the blurring effect and reduce the amount of image data that needs to be transmitted from the camera device 200 in subsequent operations. Blurring the actual background captured by the camera device 200 is one example of how a background can be blurred. In some embodiments, the process of forming a blurred background can include downsampling the pixel data received from the sensor in the camera device 200 to generate a lower resolution image. In other embodiments, an image of a generic blurred background can also be used. When using an image of a generic blurred background, the method 4000 would retrieve the generic blurred background image from memory at block 4012 and generate the composite image with the blurred background at block 4014 in a similar fashion as described above for execution of blocks 4012 and 4014 using the background image 180 of FIG. 5B. Using a generic blurred background image can be more efficient as it can require less processing of data collected from the visible light sensing elements 261-263 corresponding to the undesired background.

After block 4014 for background replacement or block 4016 for background modification is executed, the method 4000 proceeds to block 4018. At block 4018, the composite image 190 from block 4016 or the modified image 130B from block 4018 can be transmitted by the camera device 200 to the user device 110 and ultimately to the second video conferencing endpoint 102 (FIG. 1) as part of the video conference. The method 4000 can then be repeated, for example, for each frame of the video feed that is transmitted for the video conference to create the desired effect of background replacement or modification for the user 50 in the local environment L.

Camera Device with Multiple Sensors

Figure 6A:
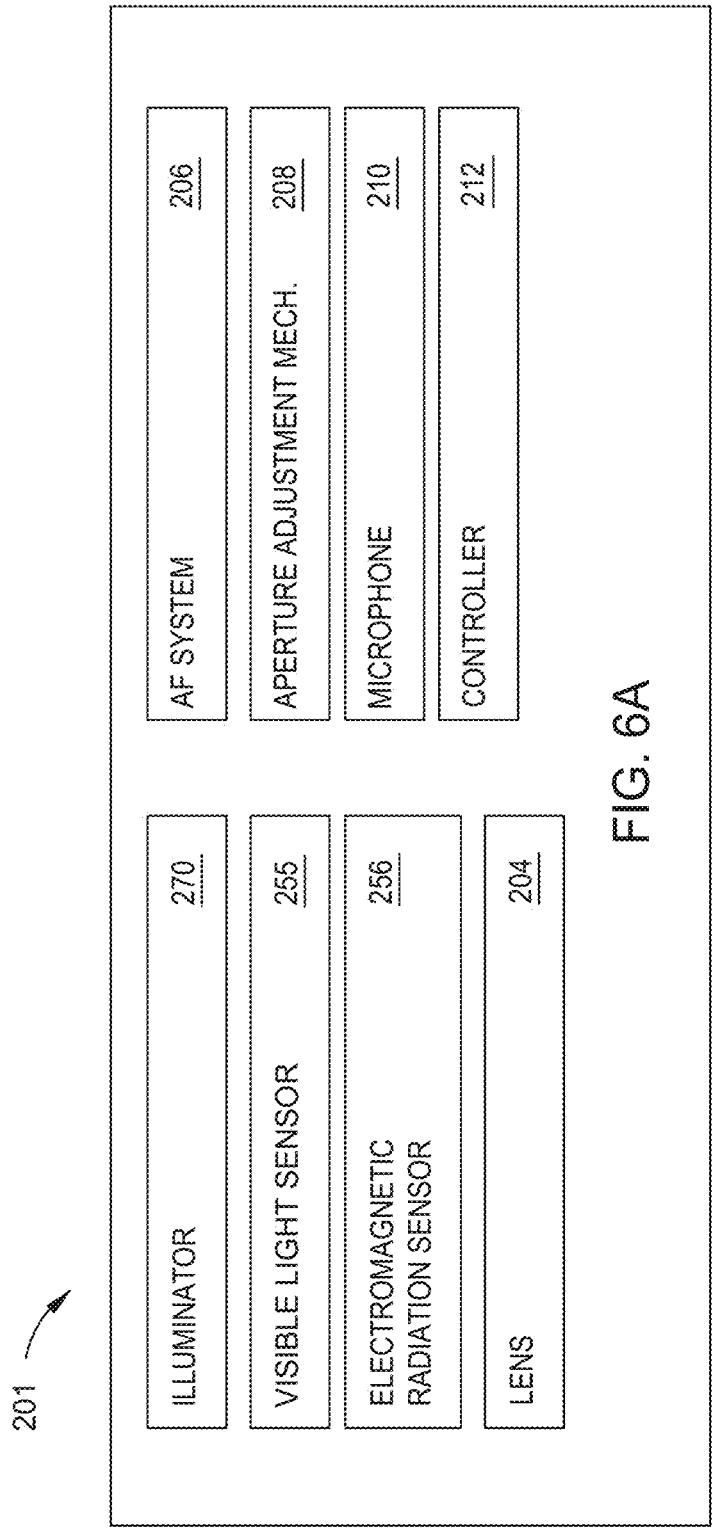
FIG. 6A is a schematic representation of an alternative camera device, according to one embodiment.

FIG. 6A is a schematic representation of an alternative camera device 201, according to one embodiment. The camera device 201 is the same as the camera device 200 (see e.g., FIG. 2A) described above except that the camera device 201 includes a visible light sensor 255 (e.g., RGB sensor) and a separate electromagnetic radiation sensor 256 instead of the single RGB-IR sensor 250 described above. In some embodiments, each sensor 255, 256 can have a sensor array of sensing elements (not shown) configured to generate images with the same resolution allowing for pixels in the visible image generated from the visible light sensor 255 to be replaced or adjusted based on corresponding pixels from the infrared image generated by the separate electromagnetic radiation sensor 256 (e.g., infrared sensor).

Figure 6B:
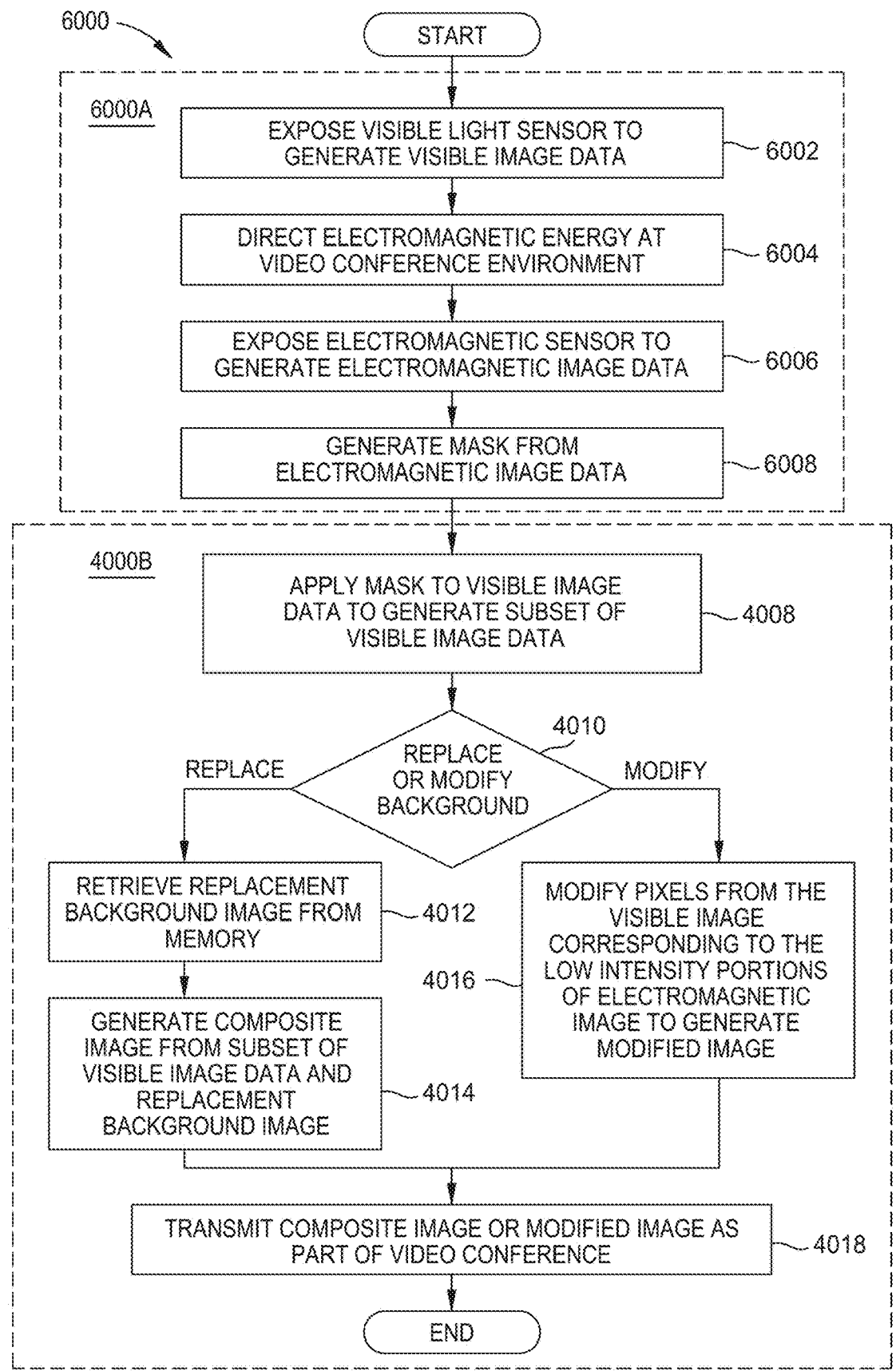
FIG. 6B is a process flow diagram of a method for generating and transmitting a visible image for a video conference without an undesired background using the camera device of FIG. 6A, according to one embodiment.

FIG. 6B is a process flow diagram of a method 6000 for generating and transmitting a visible image for a video conference without an undesired background using the camera device 201 of FIG. 6A, according to one embodiment. Transmitting the visible image without the undesired background can include transmitting the visible image with a modified version of the background captured by the camera device 201 or transmitting the visible image with a replacement background that replaces the background captured by the camera device 201. In addition to FIGS. 6A and 6B, the method 6000 is described in reference to FIGS. 1-5D. The method 6000 is described as being executed on the visible image 130 of FIG. 3A, for example by having the camera device 201 replace the camera device 200 shown in FIG. 1, so that the camera device 201 generated the visible image 130 instead of the camera device 200, as previously described above.

The method 6000 is described as being executed by operations included in a data acquisition portion 6000A and by operations included the image processing portion 4000B from FIG. 4. In the data acquisition portion 6000A, visible image data and electromagnetic radiation image data are generated based on sensor detections, and a mask is generated from the electromagnetic radiation image data. In the image processing portion 4000B, the mask generated in the data acquisition portion 6000A is applied to modify the visible image data (e.g., perform background replacement) acquired in the data acquisition portion 6000A, and a modified image is transmitted as part of the video conference. Although the data on which the image processing portion 4000B is generated from a different camera device in FIG. 6B relative to FIG. 4, the image processing portion 4000B in FIG. 6B is the same as the image processing portion 4000B described above in reference to FIG. 4, and thus the image processing portion 4000B is described in less detail here than above to not be repetitive.

Block 6002 begins the data acquisition portion 6000A. At block 6002, the visible light sensor 255 is exposed to receive visible light (i.e., radiation within the first range of wavelengths) that corresponds to the visible image 130 shown in FIG. 3A with the user 50 sitting at the desk 60 in the local environment L. Visible image data are generated from the detections of the RGB sensing elements (not shown) of the sensor 255. The visible image data can be sent to the controller 212 from the sensor 255 for additional processing as discussed below. The visible light sensor 255 can generate the visible image data in response to instructions received from the controller 212 of the camera device 201. The instructions from the controller 212 to the visible light sensor 255 can be sent to the visible light sensor 255 as part of the execution of the software application 236 in the memory 224 of the camera device 201. In some embodiments, the execution of the software application 236 can begin in response to user input on the user device 110 with the user device 110 notifying the camera device 201 to start the software application 236.

At block 6004, with the camera device 201 having replaced the camera device 200 in FIG. 1, the illuminator 270 of the camera device 201 illuminates the local environment L with the electromagnetic radiation E (i.e., radiation within the second range of wavelengths), for example infrared radiation, as shown in FIG. 1. The illuminator 270 can illuminate the local environment L in response to instructions received from the controller 212 of the camera device 201. The instructions from the controller 212 to the illuminator 270 can be sent from the controller 212 to the illuminator 270 as part of the execution of the software application 236 in the memory 224 of the camera device 201.

At block 6006, with the camera device 201 having replaced the camera device 200 in FIG. 1, the electromagnetic radiation sensor 256 is exposed to receive the electromagnetic radiation E (i.e., radiation within the second range of wavelengths) as shown in FIG. 1. The electromagnetic radiation received by the electromagnetic radiation sensor 256 at block 6006 is primarily electromagnetic radiation reflected from surfaces in the local environment L after the electromagnetic radiation was directed by the illuminator 270 at the local environment L at block 6004. Electromagnetic radiation image data are generated from the detections of the radiation sensing elements (e.g., IR sensing elements) (not shown) of the electromagnetic radiation sensor 256. The electromagnetic radiation image data can be sent to the controller 212 from the electromagnetic radiation sensor 256 for additional processing as discussed below.

In some embodiments, the visible image data generated at block 6002 is generated at a time in which electromagnetic radiation from the illuminator 270 is not directed at the local environment L. Although electromagnetic radiation outside of the visible spectrum is generally invisible to people, electromagnetic radiation can cause color changes and other distortions to visible images generated by cameras, such as the camera device 201. Thus, in some embodiments, the camera device 201 can alternate between time periods of (1) acquiring visible image data at block 6002 and (2) directing electromagnetic radiation from the illuminator 270 at block 6004 and acquiring electromagnetic radiation image data at block 6006. For example, in one embodiment the camera device 201 can switch back and forth between generating visible images and electromagnetic radiation images for every other frame acquired by the camera device 201. This technique of obtaining visible images when the illuminator 270 is not active and switching between generating visible image data and electromagnetic radiation image data can also be applied when executing similar methods using other camera devices, such as the camera device 200.

At block 6008, a mask is generated based on the electromagnetic radiation image data generated at block 6006. After receiving the electromagnetic radiation image data from the electromagnetic radiation sensor 256 at block 6006, the controller 212 can generate the mask from the electromagnetic radiation image data as part of executing the software application 236. Like the method 4000 described above, the mask generated here separates the electromagnetic radiation image data into a first group of high-intensity detections (see white pixels 140W of the foreground from FIG. 3B) above a specified electromagnetic radiation intensity threshold value and into a second group of low-intensity detections (see hatched pixels 140H of the background from FIG. 3B) below the specified electromagnetic radiation intensity threshold value.

A visible representation of the mask generated at block 6008 is shown in the electromagnetic radiation image 140 of FIG. 3B where each pixel in the infrared image 140 is either a high-intensity white pixel 140W or a low-intensity hatched pixel 140H. In this example, the user 50 has not moved during the execution of blocks 6002-6006, so the visible representation of the mask in the method 4000 (i.e., FIG. 3B) that was generated simultaneously with the visible image data can also serve as the visible representation of the mask in the method 6000 here. Completion of block 6008 ends the data acquisition portion 6000A.

The remainder of the method 6000 is directed to the image processing portion 4000B which is the same image processing portion 4000B from FIG. 4. The bulk of the image processing portion 4000B described above is not repeated here.

Block 4008 begins the image processing portion 4000B. At block 4008, the mask generated at block 6008 is applied to the visible image data (i.e., visible image 130) generated at block 6002 to generate the first subset of visible image data. Because the same mask is applied on the same set of visible image data, the application of the mask here produces the same result as the application of the mask in block 4008 of the method 4000. This same result is the first subset of visible image data which is visibly represented by the modified image 130A shown in FIG. 5A.

After block 4008, the controller 212 executes block 4010 to determine whether to perform background replacement or background modification, for example based on user selection. For background replacement, the controller 212 can execute blocks 4012 and 4014 to use the replacement background image 180 and the subset of visible image data generated at block 4008 by application of the mask (i.e., the image 130A of FIG. 5A) to generate the composite image 190 shown in FIG. 5B. For background modification, the controller 212 can execute block 4016 in which the modified visible image 130B is generated as shown in FIG. 5D.

After block 4014 for background replacement or block 4016 for background modification, the method 6000 proceeds to block 4018. At block 4018, the composite image 190 from block 4014 or the modified image 130B from block 4016 can be transmitted by the camera device 201 to the user device 110 and ultimately to the second video conferencing endpoint 102 (FIG. 1) as part of the video conference. The method 6000 can then be repeated, for example, for each frame of the video feed that is transmitted for the video conference to create the desired effect of background replacement or modification for the user 50 in the local environment L.

Camera Device with Bandpass Filter

Figure 7A:
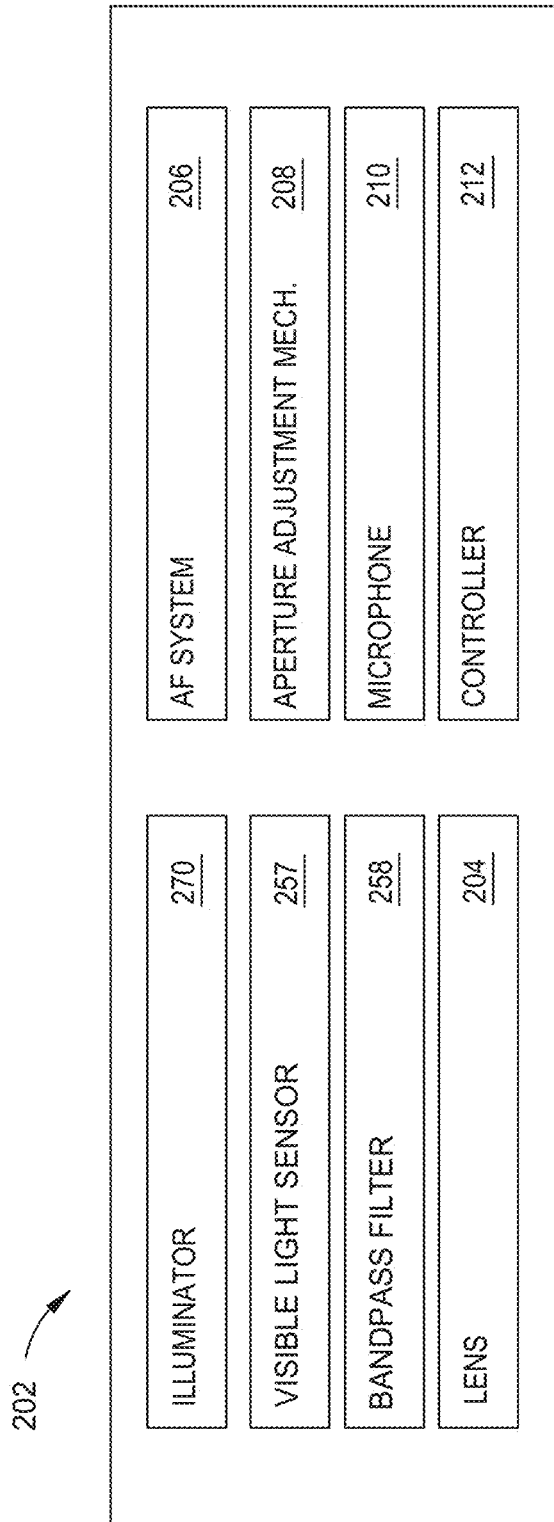
FIG. 7A is a schematic representation of another alternative camera device, according to one embodiment.

FIG. 7A is a schematic representation of another alternative camera device 202, according to one embodiment. The camera device 202 is the same as the camera device 200 described above except that the camera device 201 includes a visible light sensor 257 (e.g., RGB sensor) with visible light sensing elements (not shown) and does not include separate electromagnetic radiation sensing elements (see e.g., infrared sensing elements 264 in FIG. 2B) or a separate electromagnetic radiation sensor (see e.g., electromagnetic radiation sensor 256 in FIG. 6A). Many visible light sensors, such as many RGB sensors can detect portions of the near-infrared radiation spectrum in addition to detecting visible light.

The camera device 202 additionally includes a near-infrared bandpass filter 258, such as an 850 nm bandpass filter. The bandpass filter 258 can be configured to allow a band of electromagnetic radiation (e.g., 750-950 nm) centered around a wavelength (e.g., 850 nm) to be received by the visible light sensor 257 without allowing electromagnetic radiation outside of the band (e.g., <750 nm or >950 nm) to be received by the sensor 257 when electromagnetic radiation is directed to the sensor 257 through the bandpass filter 258. The camera device 202 can be configured to switch between (1) only allowing electromagnetic radiation that does not pass through the bandpass filter 258 to be received by the visible light sensor 257 and (2) only allowing electromagnetic radiation that does pass through the bandpass filter 258 to be received by the visible light sensor 257. For example, in one embodiment a component in the camera device 202 is rotated to control whether or not the electromagnetic energy reaches the visible light sensor 257 through the bandpass filter 258. The rotation can be continuous, for example, so that each frame captured by the camera device 202 switches back and forth between an image generated from electromagnetic energy that does not pass through the bandpass filter 258 and an image generated from electromagnetic energy that passes through the bandpass filter 258. In one embodiment, the bandpass filter 258 can be the component that is rotated to control whether or not the electromagnetic energy that reaches the visible light sensor 257 passes through the bandpass filter 258.

The sensor 257 includes an array of sensing elements (not shown), such as RGB sensing elements. Because these same sensing elements are used to generate both the visible light images and the electromagnetic radiation (e.g., infrared) images, the visible light images and the electromagnetic radiation images generated from the detections of the sensor 257 have the same resolution allowing for pixels in the visible image generated from the visible light sensor 257 to be replaced or adjusted based on corresponding pixels from the electromagnetic radiation image generated by the visible light sensor 257 when the sensor 257 is exposed to radiation transmitted through the bandpass filter 258.

Figure 7B:
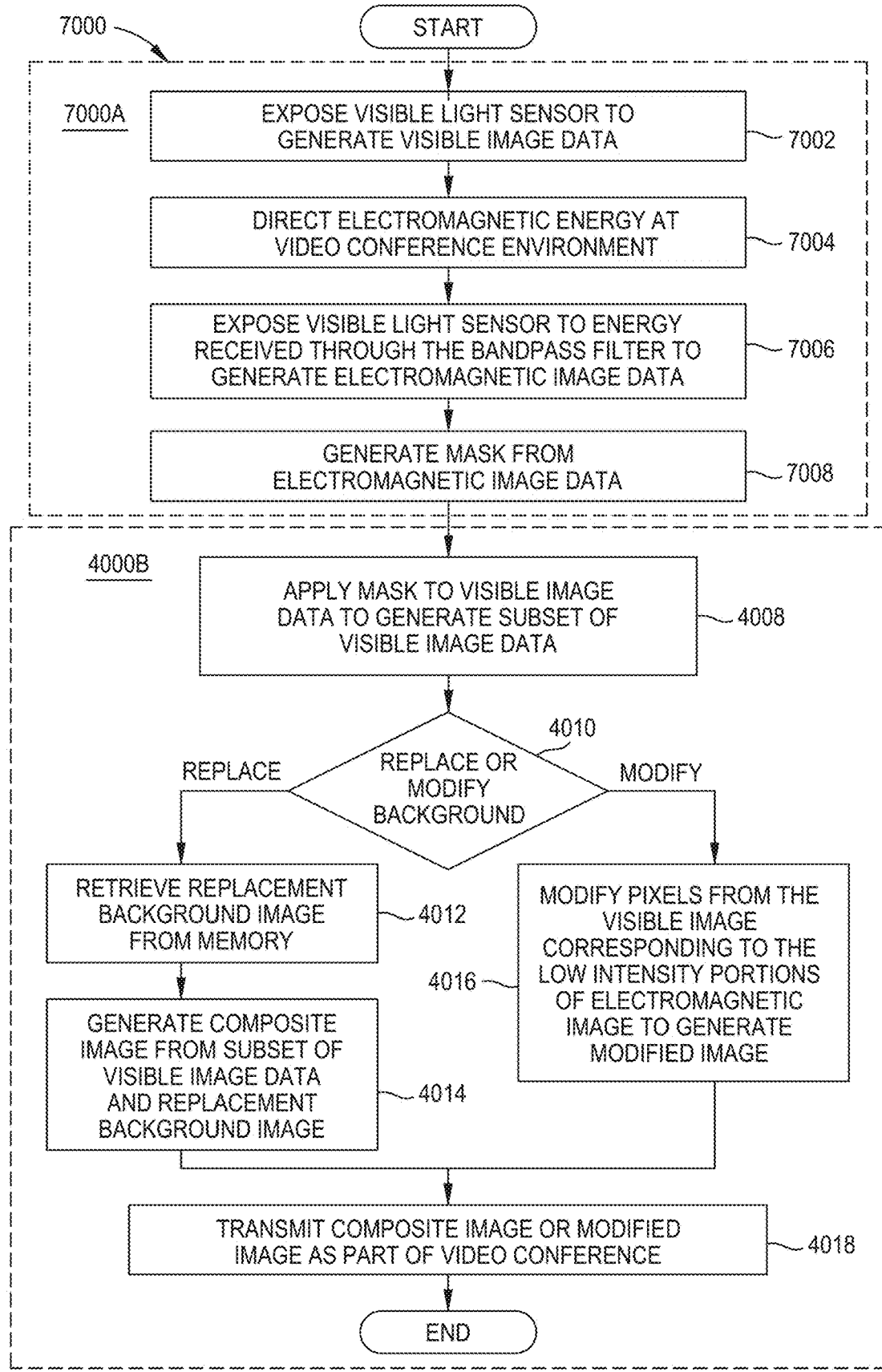
FIG. 7B is a process flow diagram of a method for generating and transmitting a visible image for a video conference without an undesired background using the camera device of FIG. 7A, according to one embodiment.

FIG. 7B is a process flow diagram of a method 7000 for generating and transmitting a visible image for a video conference without an undesired background using the camera device 202 of FIG. 7A, according to one embodiment. Transmitting the visible image without the undesired background can include transmitting the visible image with a modified version of the background captured by the camera device 202 or transmitting the visible image with a replacement background that replaces the background captured by the camera device 202. In addition to FIGS. 7A and 7B, the method 7000 is described in reference to FIGS. 1-5D. The method 7000 is described as being executed on the visible image 130 of FIG. 3A, for example by having the camera device 202 replace the camera device 200 shown in FIG. 1, so that the camera device 202 generated the visible image 130 instead of the camera device 200 as previously discussed above.

The method 7000 is described as being executed by operations included in a data acquisition portion 7000A and by operations included in the image processing portion 4000B from FIG. 4. In the data acquisition portion 7000A, visible image data and electromagnetic radiation image data are generated based on sensor detections, and a mask is generated from the electromagnetic radiation image data. In the image processing portion 4000B, the mask generated in the data acquisition portion 7000A is applied to modify the visible image data (e.g., perform background replacement) acquired in the data acquisition portion 7000A, and a modified image is transmitted as part of the video conference. Although the data on which the image processing portion 4000B is generated from a different camera device in FIG. 7B relative to FIG. 4, the image processing portion 4000B in FIG. 7B is the same as the image processing portion 7000B described above in reference to FIG. 4, and thus the image processing portion 4000B is described in less detail here than above to not be repetitive.

Block 7002 begins the data acquisition portion 7000A. At block 7002, the visible light sensor 257 is exposed to receive visible light (i.e., radiation within the first range of wavelengths) that corresponds to the visible image 130 shown in FIG. 3A with the user 50 sitting at the desk 60 in the local environment L. Visible image data are generated from the detections of the RGB sensing elements (not shown) of the sensor 257. The visible image data can be sent to the controller 212 from the sensor 257 for additional processing as discussed below. The visible light sensor 257 can generate the visible image data in response to instructions received from the controller 212 of the camera device 201. The instructions from the controller 212 to the visible light sensor 257 can be sent to the visible light sensor 257 as part of the execution of the software application 236 in the memory 224 of the camera device 201. In some embodiments, the execution of the software application 236 can begin in response to user input on the user device 110 with the user device 110 notifying the camera device 201 to start the software application 236.

At block 7004, with the camera device 202 having replaced the camera device 200 in FIG. 1, the illuminator 270 of the camera device 202 illuminates the local environment L with the electromagnetic radiation E (i.e., radiation within the second range of wavelengths), for example infrared radiation, as shown in FIG. 1. At block 7004, the illuminator 270 can direct electromagnetic radiation having a wavelength which enables the electromagnetic radiation to transmit through the bandpass filter 258 of the camera device 202. For example, if an 850 nm bandpass filter is being used as the bandpass filter 258, then the illuminator 270 can transmit electromagnetic radiation having a wavelength of 850 nm or substantially close to 850 nm, such as within 50 nm. The illuminator 270 can illuminate the local environment L in response to instructions received from the controller 212 of the camera device 202. The instructions from the controller 212 to the illuminator 270 can be sent from the controller 212 to the illuminator 270 as part of the execution of the software application 236 in the memory 224 of the camera device 202.

At block 7006, with the camera device 202 having replaced the camera device 200 in FIG. 1, the visible light sensor 257 of the camera device 200 is exposed to receive the electromagnetic radiation E (i.e., radiation within the second range of wavelengths) as shown in FIG. 1. At block 7006, the visible light sensor 257 only receives radiation that is transmitted through the bandpass filter 258. For example, as described above, the radiation received when using an 850 nm bandpass filter can primarily be limited to radiation having wavelengths between about 750 nm and about 950 nm. Thus, visible light having a maximum wavelength of around 700 nm should be entirely or substantially blocked (e.g., >95% of visible light being blocked) by the bandpass filter 258. The electromagnetic radiation received by the visible light sensor 257 at block 7006 is primarily electromagnetic radiation reflected from surfaces in the local environment L after the electromagnetic radiation was directed by the illuminator 270 at the local environment L at block 7004. Notably here, the electromagnetic radiation image data are generated from the detections of the visible light sensing elements of the visible light sensor 257, which as described above can sense portions of the electromagnetic radiation that are close to the wavelengths of visible light, such as near-infrared energy spectrum having a wavelength from about 750 nm to about 950 nm. The infrared image data generated here can be sent to the controller 212 from the visible light sensor 257 for additional processing as discussed below.

As similarly described above in reference to the method 6000, in some embodiments, the visible image data generated at block 7002 is generated at a time in which electromagnetic radiation from the illuminator 270 is not directed at the local environment L. Thus, in some embodiments, the camera device 202—like the camera device 201 described above—can alternate between time periods of (1) acquiring visible image data at block 7002 and (2) directing electromagnetic radiation from the illuminator 270 at block 7004 and acquiring electromagnetic radiation image data at block 7006. For example, in embodiment the camera device 202 can switch back and forth between generating visible images and electromagnetic radiation images for every other frame acquired by the camera device 202.

At block 7008, a mask is generated based on the electromagnetic radiation image data generated at block 7006. After receiving the electromagnetic radiation image data from the visible light sensor 257 at block 7006, the controller 212 can generate the mask from the electromagnetic radiation image data as part of executing the software application 236. Like the methods 4000 and 6000 described above, the mask generated here separates the electromagnetic radiation image data into a first group of high-intensity detections (see white pixels 140W of the foreground from FIG. 3B) above a specified electromagnetic radiation intensity threshold value and into a second group of low-intensity detections (see hatched pixels 140H of the background from FIG. 3B) below the specified electromagnetic radiation intensity threshold value.

A visible representation of the mask generated at block 7008 is shown in the infrared image 140 of FIG. 3B where each pixel in the infrared image 140 is either a high-intensity white pixel 140W or a low-intensity hatched pixel 140H. In this example, the user 50 has not moved during the execution of blocks 7002-7006, so the visible representation of the mask in the method 4000 (i.e., FIG. 3B) that was generated simultaneously with the visible image data can also serve as the visible representation of the mask in the method 7000. Completion of block 7008 ends the data acquisition portion 7000A.

The remainder of the method 7000 is directed to the image processing portion 4000B which is the same image processing portion 4000B from FIG. 4. The bulk of the image processing portion 4000B described above is not repeated here.

Block 4008 begins the image processing portion 4000B. At block 4008, the mask generated at block 7008 is applied to the visible image data (i.e., visible image 130) generated at block 7002 to generate the first subset of visible image data. Because the same mask is applied on the same set of visible image data here, the application of the mask here produces the same result as the application of the mask in block 4008 of the method 4000. This same result is the first subset of visible image data which is visibly represented by the modified image 130A shown in FIG. 5A.

After block 4008, the controller 212 executes block 4010 to determine whether to perform background replacement or background modification, for example based on user selection. For background replacement, the controller 212 can execute blocks 4012 and 4014 to use the replacement background image 180 and the subset of visible image data generated at block 4008 by application of the mask (i.e., the image 130A of FIG. 5A) to generate the composite image 190 shown in FIG. 5B. For background modification, the controller 212 can execute block 4016 in which the modified visible image 130B is generated as shown in FIG. 5D.

After block 4014 for background replacement or block 4016 for background modification, the method 7000 proceeds to block 4018. At block 4018, the composite image 190 from block 4016 or the modified image 130B from block 4018 can be transmitted by the camera device 201 to the user device 110 and ultimately to the second video conferencing endpoint 102 (FIG. 1) as part of the video conference. The method 7000 can then be repeated, for example, for each frame of the video feed that is transmitted for the video conference to create the desired effect of background replacement or modification for the user 50 in the local environment L.

Alternative Image Processing Method

Figure 8:
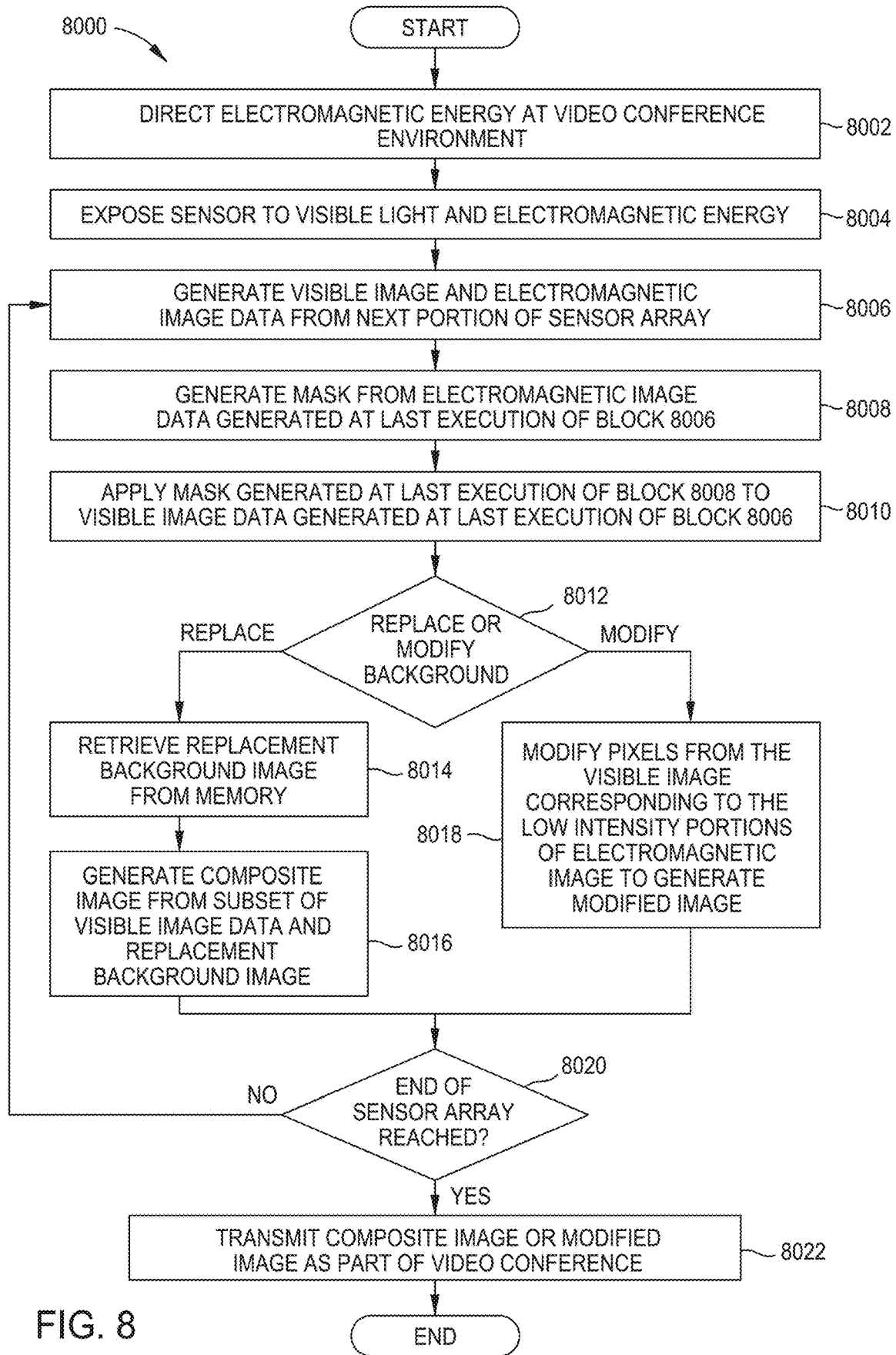
FIG. 8 is a process flow diagram of a method for generating and transmitting a visible image for a video conference without an undesired background using the camera device of FIGS. 1 and 2A, according to one embodiment.

FIG. 8 is a process flow diagram of a method 8000 for generating and transmitting a visible image for a video conference without an undesired background using the camera device 200 of FIGS. 1 and 2A, according to one or more embodiments. Transmitting the visible image without the undesired background as generally described herein can include transmitting the visible image with a modified version of the background captured by the camera device 200 or transmitting the visible image with a replacement background that replaces the background captured by the camera device 200. In addition to FIG. 8, the method 8000 is described in reference to FIGS. 1-5D. The method 8000 is similar to the method 4000 described above except that the sequence of processing the visible image data and infrared image data has been altered in the method 8000 relative to the method 4000. To avoid unnecessary repetition, in the following description, unless the method 8000 describes a portion of the process as being different than the method 4000, it can be assumed that the description above from the method 4000 applies to the corresponding portions of the method 8000.

The camera device 200 uses the hardware and software components shown in FIG. 2A and the sensor array 251 shown in FIG. 2B to execute the method 8000. The method 8000 is similar to the method 4000 described above in reference to FIG. 4 except that the process of generating the visible image without the undesired background is executed as the controller 212 obtains detection values from the visible light sensing elements 261-263 and infrared sensing elements 264 of the sensor array 251 instead of separately generating the visible image without the undesired background after the detection values from all of the sensing elements 261-264 of the entire sensor array 251 have been obtained.

For example, in the method 8000 the controller 212 can obtain detection values from the sensing elements 261-264 of a group of lines in the sensor array 251 (e.g., ten horizontal rows) and begin the process of analyzing the visible image data and infrared image data from this group of lines to begin the background replacement or modification process before or as the values from the next group of lines (e.g., the next ten horizontal rows) are obtained from the sensor array 251. This process of obtaining visible image data and infrared image data detection values from a group of lines in the sensor array 251 and performing the background replacement or modification can then be repeated until the last group of lines (e.g., last ten horizontal rows) in the sensor array 251 is read. As mentioned above, although FIG. 2B shows only include 8 rows and 8 columns of sensing elements 261-264 for ease of illustration, the sensor array 251 actually includes many more sensing elements 261-264, such as a sensor array 251 including 1080 horizontal rows of sensing elements 261-264 that is configured to generate visible images with 1080p resolution.

The method 8000 begins the same as the method 4000 with an illumination of the local environment L. At block 8002, the illuminator 270 of the camera device 200 illuminates the local environment L with the electromagnetic radiation E at the one or more emitted wavelengths provided from the illuminator 270, which, while not intending to be limiting to the disclosure provided herein, for simplicity of discussion is also sometimes referred to herein as the infrared radiation E illustrated in FIG. 1. The illuminator 270 can illuminate the local environment L in response to instructions received from the controller 212 of the camera device 200. The instructions from the controller 212 to the illuminator 270 can be sent from the controller 212 to the illuminator 270 as part of the execution of the software application 236 in the memory 224 of the camera device 200. In some embodiments, the execution of the software application 236 can begin in response to user input on the user device 110 with the user device 110 notifying the camera device 200 to start the software application 236.

At block 8004, the sensor 250 is exposed to receive visible light (i.e., radiation within the first range of wavelengths) and the electromagnetic radiation E (i.e., radiation within the second range of wavelengths) as shown in FIG. 1. The electromagnetic radiation E received by the sensor 250 at block 8004 is will include electromagnetic radiation E reflected from surfaces in the local environment L after the electromagnetic radiation E was directed by the illuminator 270 at the local environment L at block 8002.

At block 8006, visible image data and infrared image data are generated from the detections of the respective RGB and IR sensing elements 261-264 (see FIG. 2B) of the sensor 250 from a next portion of the sensor array 251, such as from a next ten horizontal rows of the sensor array 251. The visible and infrared image data from this next portion of the sensor array 251 can be sent to the controller 212 from the sensor 250. In one embodiment, the rows in the sensor array 251 are read from top to bottom, so the initial execution of block 8006 after an execution of block 8004 can correspond to generating visible image data and infrared image data from the top ten rows of the sensor array 251. Although not drawn to scale, section 801 in FIG. 3A can visually represent the visible image data generated from the first ten rows of the sensor array 251. With reference to FIGS. 1 and 3A, it can be seen that all of section 801 is taken from the background portion B of the local environment L.

In the method 8000, all of the visible image data corresponding to the visible image 130 is obtained as execution of block 8006 is repeated as described in fuller detail below. Similarly, infrared image data is generated for all of the rows in the sensor array 251 as execution of block 8006 is repeated as described in fuller detail below. As an example, for a sensor configured to generate 1080p images, block 8006 can be repeated 108 times for each exposure of the sensor 250 (i.e., for each execution of block 8004) when block 8006 is executed on a portion of the sensor array 251 having a size of ten horizontal rows for each repetition of block 8006.

Generating the visible image data and the infrared image data can include generating intensity values for each type of electromagnetic energy (i.e., RGB and IR) for each sensing element 261-264 location as described above. Algorithms, such as the interpolation techniques referenced above, can be used to generate these intensity values for each sensing element 261-264 location of the sensor array 251. Reading ten rows of sensing elements 261-264 at a time is given as an example here, but more or fewer rows of sensing elements 261-264 can be read during each execution of block 8006. In some embodiments, the number of rows of sensing elements 261-264 read during block 8006 can correspond or be related to the number of rows used in one or more of the interpolation techniques used to generate the RGB intensity values and the infrared intensity values for each sensing element 261-264 location on the sensor array 251. For example, if the process of generating an infrared intensity value for each sensing element 261-264 location on the sensor array 251 involves performing an interpolation technique using a 10×10 square of nearest neighbors of sensing elements 261-264, then it can be useful to read ten rows or some multiple of ten rows at each execution of block 8006.

The following describes generating a mask from the infrared image data generated at block 8006, and applying the mask to the visible image data generated at block 8006, but in some embodiments, the process may need to be somewhat staggered, so that there is enough data generated at block 8006 to perform the interpolation techniques used to generate the RGB and IR intensity value for each sensing element 261-264 location on the sensor array 251. For example, in one embodiment, it may be useful to perform block 8006 one or more times after the initial execution of block 8006 for each exposure of the sensor 250 at block 8004 before proceeding to block 8008 to ensure that there is enough data to perform the interpolation technique being used and to ensure there is enough data to perform the blocks in the method 8000 following block 8006. For example, if ten rows of the sensor array 251 are read during an execution of block 8006 and the interpolation technique being used is performed for each sensing element 261-264 location by using the five nearest rows, then it can be beneficial to perform block 8006 twice before proceeding. By performing block 8006 twice, there will be enough data to perform the interpolation technique on the tenth row in the set of ten rows, and the intensity values can be generated for all of the sensing element 261-264 locations in the first ten rows before proceeding to the initial execution of block 8008.

At block 8008, a mask is generated from the infrared image data generated from the most recent execution of block 8006, where the generated infrared image data includes an infrared intensity value for each sensing element 261-264. The controller 212 can generate the mask from the infrared image data generated at block 8006 as part of executing the software application 236. On the initial execution of block 8008, the initial mask can correspond to mask 811 shown in FIG. 3B. Mask 811 is generated from the first ten rows of infrared image data, which was generated from the first execution of block 8006 and possibly a second execution of block 8006 if needed to generate the infrared image data for each sensing element 261-264 location in the first ten rows. Mask 811 is entirely located in the hatched area 140H of infrared image 140 in FIG. 3B. The corresponding visible image data for the first ten rows of the sensor array 251 is shown in section 801 of FIG. 3A, which as discussed above in reference to block 8006 is visible image data taken entirely from the background portion B of the local environment L. As also discussed above in reference to FIG. 1, due to the greater distance of the surfaces in the background portion B to the camera device 200 relative to the surfaces in foreground portion F, the infrared energy E reflected from the background portion B and received at the sensor 250 (e.g., the infrared energy received at the first ten rows the of the sensor array 251) is lower than the specified intensity threshold, which results in the mask 811 for the infrared image data for the first ten rows shown in block 811 being entirely located in the low-intensity hatched area 140H of infrared image 140. Block 8008 can be repeated the same number of times that block 8006 is repeated for each exposure of the sensor 250 at block 8004.

At block 8010, the mask generated at the most recent execution of block 8008 is applied to the visible image data generated at the most recent execution of block 8006, which is the visible image data generated for each sensing element 261-264 location that has been determined from the interpolation technique being used. For example, on the initial execution of 8010, the mask 811 (FIG. 3B) is applied to visible image data generated at block 8006 that corresponds to section 801 (FIG. 3A). Mask 811 (FIG. 3B) is located entirely in the hatched area 140H, and thus the mask 811 can function to place the visible image data from section 801 (FIG. 3A) in the second subset of visible image data described above in reference to FIG. 4, which is the subset of visible image data that is either removed from or modified (e.g., blurred) in the image that is ultimately transmitted as part of the video conference. Here, application of the mask 811 on the section 801 is visibly represented by section 821 in FIG. 5A to show that the visible image data in the first ten rows of FIG. 3A is separated from the first subset of visible image data that is still shown in FIG. 5A with this separation being shown by the repeating X-pattern in section 821 and for the other portions of FIG. 5A that are not part of the first subset of visible image data.

At block 8012, the controller 212 determines whether background replacement or background modification has been selected, for example as part of the execution of software application 236. This selection can be made by the user, for example by interacting with the user device 110, which is in communication with the camera device 200 or by the user directly interacting with the camera device 200. If background replacement is selected, then the method 8000 proceeds to block 8014. If background modification is selected, then the method 8000 proceeds to block 8018.

At block 8014, when background replacement is selected, a replacement background image is retrieved from memory 224. The controller 212 can retrieve the replacement background image from the replacement backgrounds 240 of the memory 224 as part of the execution of the software application 236. As introduced above, FIG. 5B is a replacement background image 180 that includes three clouds 181-183, two mountains 184, 185, and a sun 186. The replacement background image 180 can have a same resolution as the original visible image 130 from FIG. 3A, so that each pixel from the visible image data generated at block 8010 in the first subset of visible image data can replace a corresponding pixel from the replacement background image. Or stated another way, each empty pixel location not filled by the first subset of image data generated at block 8010 can be filled by a pixel from the corresponding location in the replacement background image 180.

At block 8016, a section of the composite image 190 shown in FIG. 5C is generated from one or more of corresponding sections from the (1) the first subset of visible image data generated by the most recent application of the mask at block 8010 and (2) the replacement background image 180 retrieved at block 8014. The controller 212 can generate the section of the composite image 190 as part of the execution of the software application 236. For example, on the initial execution of block 8016 when background replacement is selected, the section 841 can be formed as the first section in the composite image 190 in FIG. 5C. Due to application of the mask 811 (FIG. 3B) section 841 is taken entirely from the replacement background image 180.

Subsequent applications of other masks during repeated executions of block 8016 as additional rows of the sensor array 251 are read can result in sections being formed in the composite image 190 that include pixels from the visible image data captured by the camera device 200 (i.e., data from the first subset of visible image data) and/or pixels from the replacement background image 180. For example, subsequent executions of block 8016 can form sections 842 and 843 as shown in FIG. 5C. Section 842 includes pixels generated from visible image data captured by the camera device 200 and pixels from the replacement background image 180 while section 843 only includes pixels from the replacement background image 180. Blocks 8014 and 8016 can be repeated until the visible image data and infrared image data are obtained from the end of the sensor array and the composite image 190 is fully formed.

On the other hand, when background modification is selected instead of background replacement, the method 8000 proceeds from block 8012 to block 8018. At block 8018, a section of the modified visible image 130B is generated as shown in FIG. 5D. The controller 212 can generate the section of the modified visible image 130B as part of the execution of the software application 236. For example, on the initial execution of block 8018 when background modification is selected, the section 851 can be formed as the first section in the modified visible image 130B in FIG. 5D. The pixels in section 851 have been blurred. Blurring is one example of background modification that can be performed on a background of an image. The section 851 of the modified image 130B can be generated at block 8018 by the controller 212 performing a software blurring process that modifies the second subset of visible image data as part of the execution of the software application 236. The blurring process can include a process that is similar to a downsampling process or a process that uses one or more of a Gaussian filter, a box filter, and a median filter.

After block 8016 for background replacement or block 8018 for background modification is executed, the method 8000 proceeds to block 8020. At block 8020, the controller 212 determines whether detection values from the end of the sensor array 251 were generated during the most recent execution of block 8006. If detection values were not obtained from the end of the sensor array 251 during the last execution of block 8006, then the method 8000 repeats the execution of blocks 8006-8020 including execution of blocks 8014 and 8016 for background replacement or block 8018 for background modification. Used herein, referring to execution of blocks 8006-8020 refers to completing the execution of each block 8006-8012 and 8020 and either (1) blocks 8014 and 8016 for background replacement or (2) block 8018 for background modification. The repeating of blocks 8006-8020 until the end of the sensor array 251 results in either the formation of the composite image 190 for background replacement or the formation of modified visible image 130B for background modification. After the formation of the composite image 190 or the modified visible image 130B, a frame for the video conference is ready to be transmitted as part of the video conference. When detection values were obtained from the end of the sensor array 251 during the last execution of block 8006, then the method 8000 proceeds to block 8022.

At block 8022, the composite image 190 or the modified image 1306 can be transmitted by the camera device 200 to the user device 110 and ultimately to the second video conferencing endpoint 102 (FIG. 1) as part of the video conference. The method 8000 can then be repeated starting back at block 8002, for example, for each frame of the video feed that is transmitted for the video conference to create the desired effect of background replacement or modification for the user 50 in the local environment L.

Using the method 8000, the camera device 200 can transmit a video frame for a video conference more quickly than other methods, which perform background replacement or modification only after data corresponding to an entire visible image has been obtained, such as the method 4000 described above. The method 8000 can begin the background replacement or modification process when a relatively small amount of the visible image data and electromagnetic image data from the sensor 250 has been obtained. For example, in some embodiments the background replacement or modification process can begin when the proportion of data that has been obtained from the sensor array 251 for a single exposure of the sensor array 251 is from about 1% and about 5% or from about 0.1% to about 1% or even to proportions less than 0.1%. For example, for a sensor configured to generate 1080p images and a method is used in which ten horizontal rows of the sensor array 251 are obtained during a repeated process, such as the method 8000 described above, the background replacement or modification process can begin when detection values of only 10 of the 1080 horizontal rows of the sensor array have been obtained representing 0.9235% of the horizontal rows of the sensor array.

Although the method 8000 is described as being performed by repeating blocks 8006-8020 in a sequential manner, this is largely for ease of description and is not meant to be limiting in any way. For example, the generation of the detection values for the visible image data and infrared image data for the next portion of the sensor array 251 (e.g., the next ten horizontal rows) can begin after the generation of the detection values for the visible image data and infrared image data for the previous portion of the sensor array 251 (e.g., the previous ten horizontal rows) is completed. Thus, there is no need to wait for the execution of any of the blocks 8008-8020 before executing block 8006 again, and some portions of the method 8000 can be performed in parallel with each other.

Although portions of the method 8000 can be performed in parallel, much of the background replacement or modification can be performed before large portions of the sensor array 251 are read for a given exposure of the sensor 250. The following is illustrative example of the timing for when different portions of the method 8000 can be performed. During a first time period, the sensor 250 is exposed to the visible light (electromagnetic radiation in the first range of wavelengths) and electromagnetic energy E (electromagnetic radiation in the second range of wavelengths) at block 8004. During a second time period occurring after the first time period, a first set of visible image data can be generated, for example at block 8006, in response to the electromagnetic radiation received in the first range of wavelengths on a first portion of the sensor array 251 (e.g., the first ten rows of the sensor array 251) during the first time period. Also during the second time period, a first set of electromagnetic image data can be generated, for example at block 8006, in response to the electromagnetic radiation received in the second range of wavelengths on the first portion of the sensor array 251 during the first time period, wherein the first set of electromagnetic image data includes information relating to the intensities (e.g., intensity values) of the electromagnetic energy in the second range of wavelengths received at the first portion of sensor array 251 during the first time period. Then also during the second time period, at least some of the first set of visible image data generated during the second time period can be replaced or modified, for example during execution blocks 8014 and 8016 or 8018, based on the first set of electromagnetic image data generated during the second time period.

Then during a third time period occurring after the second time period, a second set of visible image data can be generated, for example during a repeated execution of block 8006, from a second portion of the sensor array 251 (e.g., rows 31-40 in the sensor array 251) in response to the electromagnetic radiation received in the first range of wavelengths on the second portion of the sensor array 251 during the first time period (i.e., the same execution of block 8004 used to generate the first set of visible image data). Also during the third time period, a second set of electromagnetic image data can be generated in response to the electromagnetic radiation received in the second range of wavelengths on the second portion of the sensor array 251 during the first time period, wherein the second set of electromagnetic image data includes information relating to the intensities (e.g., intensity values) of the electromagnetic energy in the second range of wavelengths received at the second portion of sensor array 251 during the first time period. Then also during the third time period, at least some of the second set of visible image data generated during the third time period can be replaced or modified, for example during repeated execution blocks 8014 and 8016 or 8018, based on the second set of electromagnetic image data generated during the third time period.

Continuing the example from above, during a fourth time period occurring after the third time period, a third set of visible image data can be generated, for example during a repeated execution of block 8006, from a third portion of the sensor array 251 (e.g., rows 61-70 in the sensor array 251) in response to the electromagnetic radiation received in the first range of wavelengths on the third portion of the sensor array 251 during the first time period (i.e., the same execution of block 8004 used to generate the first set of visible image data). This process can continue to be repeated during subsequent periods of time for a single exposure of the sensor array 251 until the end of the sensor array 251 is read and the background is replaced or modified as appropriate. A key feature is that large portions of the sensor array 251 remain to be read after the background replacement or modification process has started, so that by the time the end of the sensor array 251 is read, the remaining background replacement or modification is substantially reduced, which enables a frame for the video conference including the replaced or modified background to be quickly transmitted as part of the video conference.

Beginning the background replacement or modification process when only a relatively small amount of the data from the sensor array 251 has been obtained (e.g., <1%) can reduce the latency of the video conferencing system 100 when transmitting recently captured images for the video conference. Reducing latency in a video conference is important for continuing the process of making a video conference feel more like a conversation between people in the same room. As mentioned above, conventional background replacement and modification processes wait for all of the visible image data to be read from the corresponding image sensor before performing the background replacement or modification process, which can result in delay, such as a delay with a duration of a typical frame of the video conference or longer often resulting in a lag that is noticeable to the user(s). Conversely, the method 8000 can significantly reduce the duration of this delay by beginning the process of background replacement or modification when only a relatively small amount of the visible image data has been obtained, such as <1%. For example, in some embodiments, the delay caused by the background replacement or modification performed by the method 8000 can be reduced to a small portion of the duration of the frame, such as delay that is from about 5% to about 20% of the duration of the frame. Thus, compared to a delay that is as long as the duration of the frame, the delay caused by the background modification process in conventional process can be reduced by a factor of about 5 to a factor of about 20.

In the methods described above, the undesired portions of a video conference environment (e.g., an undesired background) can be removed or modified by taking advantage of the relatively fast decay of electromagnetic radiation (e.g., infrared radiation) over distance. In a typical video conference environment, infrared radiation decays at a rate that is sufficient to separate undesired portions of the video conference environment (e.g., an undesired background) from desired portions of the video conference environment (e.g., a desired foreground including the user(s)) based on the differences measured by a sensor of intensities of the infrared radiation received from across the video conference environment. Performing background modification using the methods and camera devices described above that take advantage of this intensity decay of electromagnetic radiation over distance is significantly less cumbersome for many users (e.g., a remote worker) than conventional methods, such as chroma key compositing which requires a monochrome background screen, such as a green screen. Furthermore, the camera devices described above can perform the methods without the use of artificial intelligence algorithms that often require computational power that exceeds the equipment that a user may have available.

The identification and removal or modification of the undesired background is performed by the camera devices 200-202 described above, so the methods 4000, 6000, 7000, and 8000 described above can be performed with any user device (e.g., smart phone, laptop, tablet, etc.) that can perform a video conference without background replacement or modification. Furthermore, because the identification and removal or modification of the undesired background is performed by the camera devices 200-202 described above, the video feed already having the modified or replaced background can be fed to numerous video conferencing applications (e.g., Microsoft® Skype®, Apple® FaceTime® and applications available from Zoom® Video Communications) on one or more user devices for use in the video conference. This can allow user(s) to switch between a first video conferencing application and a second video conferencing application, for example on user device 110, without having to perform any additional configuration steps on the new video conferencing application to achieve the desired background replacement or modification because the background replacement or modification is performed by the peripheral camera device (e.g., any of camera device 200-202) and not by the user device 110.

Furthermore, because the undesired background is removed or modified by the respective camera devices 200-202 and not by another device. Therefore, the data corresponding to the undesired background is not transmitted to another device. Conventional techniques generally perform the background removal and modification using a device (e.g., a server or personal computer) other than a peripheral camera device, such as the camera devices 200-202, that originally captures the images for the video feed. Removal of undesired background from the video stream at the camera device substantially reduces the bandwidth required relative to other methods which remove the undesired background after the undesired background is transmitted to another device.

While the foregoing is directed to embodiments of the present disclosure, other and further embodiments of the disclosure may be devised without departing from the basic scope thereof, and the scope thereof is determined by the claims that follow.

The invention claimed is:

1. A method of generating an image, comprising:
receiving, on a plurality of sensing elements of a sensor array, electromagnetic radiation during a first time period from a first environment, wherein the electromagnetic radiation comprises radiation within a first range of wavelengths and radiation within a second range of wavelengths;
generating, during a second time period, a first set of visible image data in response to the electromagnetic radiation received in the first range of wavelengths on a first portion of the sensor array during the first time period;
generating, during the second time period, a first set of electromagnetic image data in response to the electromagnetic radiation received in the second range of wavelengths on the first portion of the sensor array during the first time period, wherein the first set of electromagnetic image data includes information relating to the intensities of the electromagnetic radiation in the second range of wavelengths received at the first portion of the sensor array during the first time period;
replacing or modifying at least some of the first set of visible image data generated during the second time period based on the first set of electromagnetic image data generated during the second time period; and
generating, during a third time period, a second set of visible image data in response to the electromagnetic radiation received in the first range of wavelengths on a second portion of the sensor array during the first time period, wherein the second time period occurs after the first time period, and the third time period occurs after the second time period.

2. The method of claim 1, further comprising:
generating, during the third time period, a second set of electromagnetic image data in response to the electromagnetic radiation received in the second range of wavelengths on the second portion of the sensor array during the first time period, wherein the second set of electromagnetic image data includes information relating to the intensities of the electromagnetic radiation received at the second portion of the sensor array during the first time period; and
replacing or modifying at least some of the second set of visible image data generated during the third time period based on the second set of electromagnetic image data generated during the third time period.

3. The method of claim 2, further comprising generating, during a fourth time period, a third set of visible image data in response to the electromagnetic radiation received in the first range of wavelengths on a third portion of the sensor array during the first time period, wherein the fourth time period occurs after the third time period.

4. The method of claim 1, further comprising generating a composite image comprising a portion of the first set of visible image data and a portion of a background replacement image.

5. The method of claim 4, further comprising transmitting the composite image to a second environment.

6. The method of claim 1, wherein a number of the plurality of sensing elements in the first portion of the sensor array comprises less than ten percent of a total of the plurality of sensing elements in the sensor array.

7. The method of claim 1, wherein at least some of the visible image data generated during the second time period is not modified or replaced.

8. The method of claim 1, wherein the at least some of the first set of visible image data that is modified or replaced corresponds to locations in the first portion of the sensor array at which the electromagnetic image data indicates a lower intensity relative to locations in the first portion of the sensor array for which the visible image data in the first set of visible image data is not modified.

9. The method of claim 1, wherein the sensor array includes red-light sensing elements, green-light sensing elements, blue-light sensing elements, and infrared sensing elements.

10. The method of claim 1, further comprising directing electromagnetic radiation within the second range of wavelengths at the first environment from an illuminator, wherein the second range of wavelengths comprise wavelengths within an infrared range, and the electromagnetic radiation received by the sensor array is primarily infrared radiation reflected from surfaces in the first environment after the electromagnetic radiation was directed by the illuminator at the first environment.

11. A camera device for use with a video streaming system, the camera device comprising:
a lens;
a sensor including a sensor array configured to generate image data from electromagnetic radiation received from a first environment; and
a controller comprising a processor and a non-transitory computer readable medium that includes instructions which when executed by the processor are configured to cause the camera device to:
receive, on a plurality of sensing elements of the sensor array, the electromagnetic radiation during a first time period from the first environment, wherein the electromagnetic radiation comprises radiation within a first range of wavelengths and radiation within a second range of wavelengths;
generate, during a second time period, a first set of visible image data in response to the electromagnetic radiation received in the first range of wavelengths on a first portion of the sensor array during the first time period;
generate, during the second time period, a first set of electromagnetic image data in response to the electromagnetic radiation received in the second range of wavelengths on the first portion of the sensor array during the first time period, wherein the first set of electromagnetic image data includes information relating to the intensities of the electromagnetic radiation in the second range of wavelengths received at the first portion of the sensor array during the first time period;
replace or modify at least some of the first set of visible image data generated during the second time period based on the first set of electromagnetic image data generated during the second time period; and
generate, during a third time period, a second set of visible image data in response to the electromagnetic radiation received in the first range of wavelengths on a second portion of the sensor array during the first time period, wherein the second time period occurs after the first time period, and the third time period occurs after the second time period.

12. The camera device of claim 11, wherein execution of the instructions further causes the camera device to:
generate, during the third time period, a second set of electromagnetic image data in response to the electromagnetic radiation received in the second range of wavelengths on the second portion of the sensor array during the first time period, wherein the second set of electromagnetic image data includes information relating to the intensities of the electromagnetic radiation received at the second portion of the sensor array during the first time period; and
replace or modify at least some of the second set of visible image data generated during the third time period based on the second set of electromagnetic image data generated during the third time period.

13. The camera device of claim 12, wherein the execution of the instructions further causes the camera device to generate, during a fourth time period, a third set of visible image data in response to the electromagnetic radiation received in the first range of wavelengths on a third portion of the sensor array during the first time period, wherein the fourth time period occurs after the third time period.

14. The camera device of claim 11, wherein execution of the instructions further causes the camera device to generate a composite image comprising a portion of the first set of visible image data and a portion of a background replacement image.

15. The camera device of claim 14, wherein the execution of the instructions further causes the camera device to transmit the composite image to a second environment.

16. The camera device of claim 11, wherein a number of the plurality of sensing elements in the first portion of the sensor array comprises less than ten percent of a total of the plurality of sensing elements in the sensor array.

17. The camera device of claim 11, wherein at least some of the visible image data generated during the second time period is not modified or replaced.

18. The camera device of claim 11, wherein the at least some of the first set of visible image data that is modified or replaced corresponds to locations in the first portion of the sensor array at which the electromagnetic image data indicates a lower intensity relative to locations in the first portion of the sensor array for which the visible image data in the first set of visible image data is not modified.

19. The camera device of claim 11, wherein the sensor array includes red-light sensing elements, green-light sensing elements, blue-light sensing elements, and infrared sensing elements.

20. The camera device of claim 11, wherein execution of the instructions further causes the camera device to direct electromagnetic radiation within the second range of wavelengths at the first environment from an illuminator, wherein the second range of wavelengths comprise wavelengths within an infrared range, and the electromagnetic radiation received by the sensor array is primarily infrared radiation reflected from surfaces in the first environment after the electromagnetic radiation was directed by the illuminator at the first environment.

\* \* \* \* \*